(12) United States Patent
Ge

(10) Patent No.: US 9,231,667 B2
(45) Date of Patent: Jan. 5, 2016

(54) SYSTEMS AND METHODS FOR A LONG-TERM EVOLUTION NETWORK

(71) Applicant: Futurewei Technologies, Inc., Dallas, TX (US)

(72) Inventor: Yiqun Ge, Longueuil (CA)

(73) Assignee: Futurewei Technologies, Inc., Plano, TX (US)

( * ) Notice: Subject to any disclaimer, the term of this patent is extended or adjusted under 35 U.S.C. 154(b) by 251 days.

(21) Appl. No.: 13/774,495

(22) Filed: Feb. 22, 2013

(65) Prior Publication Data

US 2014/0243029 A1    Aug. 28, 2014

(51) Int. Cl.
| | | |
|---|---|---|
| H04B 15/00 | (2006.01) | |
| H04B 7/02 | (2006.01) | |
| H04W 56/00 | (2009.01) | |
| H04B 7/06 | (2006.01) | |

(52) U.S. Cl.
CPC ............ *H04B 7/024* (2013.01); *H04B 7/0626* (2013.01); *H04W 56/0015* (2013.01)

(58) Field of Classification Search
CPC ............ H04W 56/0015; H04W 24/02; H04W 52/241; H04W 88/08
USPC .............. 455/501, 500, 517, 67.11, 507, 503, 455/515, 550.1, 445, 422.1, 403, 426.1, 455/426.2, 423–425, 524, 525, 453, 509, 455/450; 370/241, 251, 310, 328, 329, 338, 370/343
See application file for complete search history.

(56) References Cited

U.S. PATENT DOCUMENTS

| | | | |
|---|---|---|---|
| 7,362,799 B1* | 4/2008 | Petrus | 375/224 |
| 2009/0196162 A1* | 8/2009 | Sambhwani et al. | 370/201 |
| 2009/0232247 A1* | 9/2009 | Nam et al. | 375/267 |
| 2011/0194423 A1* | 8/2011 | Cho et al. | 370/252 |
| 2012/0281780 A1* | 11/2012 | Huang et al. | 375/267 |
| 2013/0028244 A1 | 1/2013 | Avivi et al. | |
| 2013/0157675 A1* | 6/2013 | Li et al. | 455/452.1 |
| 2013/0196632 A1* | 8/2013 | Horn et al. | 455/411 |
| 2014/0211689 A1* | 7/2014 | Ashikhmin et al. | 370/328 |
| 2015/0031407 A1* | 1/2015 | Moshfeghi | 455/509 |

FOREIGN PATENT DOCUMENTS

| | | |
|---|---|---|
| CN | 102546483 | 7/2012 |
| CN | 102726016 | 10/2012 |
| WO | 2013009483 | 1/2013 |

* cited by examiner

*Primary Examiner* — Keith Ferguson

(57) ABSTRACT

A system and method for a LTE network device is provided. The system includes a first signal processing center configured to obtain a plurality of metrics from an LTE network device. The first signal processing center includes a plurality of processors configured to calculate interference based on the plurality of metrics. The signal processing system further includes a second signal processing center configured to receive the calculated interference from the first signal processing center.

12 Claims, 10 Drawing Sheets

SYSTEMS AND METHODS FOR A LONG-TERM EVOLUTION NETWORK

TECHNICAL FIELD

The present disclosure relates generally to digital communications, and more particularly to systems and methods for a long term evolution (LTE) network device.

BACKGROUND

LTE is a standard for wireless data communications technology and an evolution of the Global System for Mobile Communications (GSM) and Universal Mobile Telecommunications System (UMTS) standards. LTE increases the capacity and speed of wireless data networks using new digital signal processing (DSP) techniques and modulations. The LTE network architecture is an Internet Protocol (IP)-based system with significantly reduced transfer latency than the third generation architecture. Compared to earlier wireless networks such as 2G and 3G networks, the LTE wireless network operates on a separate wireless spectrum and is thus incompatible with earlier networks. The LTE standard can be used with many different frequency bands. In North America, 700/800 and 1700/1900 MHz are used; 800, 900, 1800, 2600 MHz are used in Europe; 1800 and 2600 MHz are used in Asia; and 1800 MHz is used in Australia.

LTE may provide a downlink peak rates of 300 Mbit/s, uplink peak rates of 75 Mbit/s and QoS provisions permitting a transfer latency of less than 5 ms in the radio access network. LTE has the ability to manage fast-moving mobiles and supports multi-cast and broadcast streams. LTE supports scalable carrier bandwidths, from 1.4 MHz to 20 MHz and supports both frequency division duplexing (FDD) and time-division duplexing (TDD).

Release 8 of the 3GPP specifications defines the LTE towards 4th generation systems, includes new requirements for spatial multiplexing—also referred to as Multiple Input Multiple Output (MIMO)—wherein the base station and user equipment (UE) communicate using two or more spatial streams. The goal is to increase both the overall capacity of a cell and the data rate that a single user can expect from the system. As a result of the increasing data rates and flexibility, the design and test of LTE systems differs in many ways from previous generations of cellular technology. In particular, LTE network device design and test present new challenges for which test equipment and measurement methods must be adapted.

In a conventional LTE system, signal processing for the UEs is converged in a powerful signal processing center including a plurality of function blocks. However, as the number of cells increasing, the computing capacity of function block is increased geometrically. The bandwidth between two function blocks is increased geometrically and the buffer is increased geometrically. Thus, the signal processing center may reach to its bottleneck due to heat, power, memory, and bus limitations.

SUMMARY

In a first illustrative embodiment, an LTE network device includes a receiver, a processor connected with the receiver, and a transmitter. The receiver is configured to receive signals from a plurality of terminals. The receiver is further configured to obtain channel coefficients, and a covariance matrix of interference-plus-noise based on the received signals. The processor is configured to calculate a plurality of metrics based on the received raw signals, channel coefficients, and a covariance matrix of interference-plus-noise. The transmitter is configured to transmit the calculated metrics to a signal processing center.

In a second illustrative embodiment of the present disclosure, a method for interference cancellation is implemented in an LTE communication system. In the method, an LTE network device having a processor obtains signals, channel coefficients, and a covariance matrix of interference-plus-noise from a plurality of terminals. The LTE network device generates a plurality of metrics based on the received raw signals, channel coefficients, and a covariance matrix of interference-plus-noise. The LTE network device transmits the calculated metrics to a signal processing center.

In a third illustrative embodiment, a signal processing center includes a plurality of processors connected with a receiver. The plurality of processors is configured to obtain a plurality of metrics from an LTE network device. The plurality of metrics is generated based on raw signals, channel coefficients, and a covariance matrix of interference-plus-noise from a plurality of user elements. Each processor includes a decoder configured to decode based on the plurality of metrics.

In a fourth illustrative embodiment, a signal processing system includes a first signal processing center configured to obtain a plurality of metrics from an LTE network device. The first signal processing center includes a plurality of processors configured to calculate interference based on the plurality of metrics. The signal processing system further includes a second signal processing center configured to receive the calculated interference from the first signal processing center.

BRIEF DESCRIPTION OF THE DRAWINGS

For a better understanding of the present disclosure, reference is now made to the following descriptions taken in conjunction with the accompanying drawings, in which.

DETAILED DESCRIPTION

The making and using of the current example embodiments are discussed in details below. It should be appreciated, however, that the present disclosure provides many applicable inventive concepts that may be embodied in a wide variety of specific contexts. The example embodiments discussed are merely illustrative of specific ways to make and use the disclosure, and do not limit the scope of the disclosure.

Figure 1:
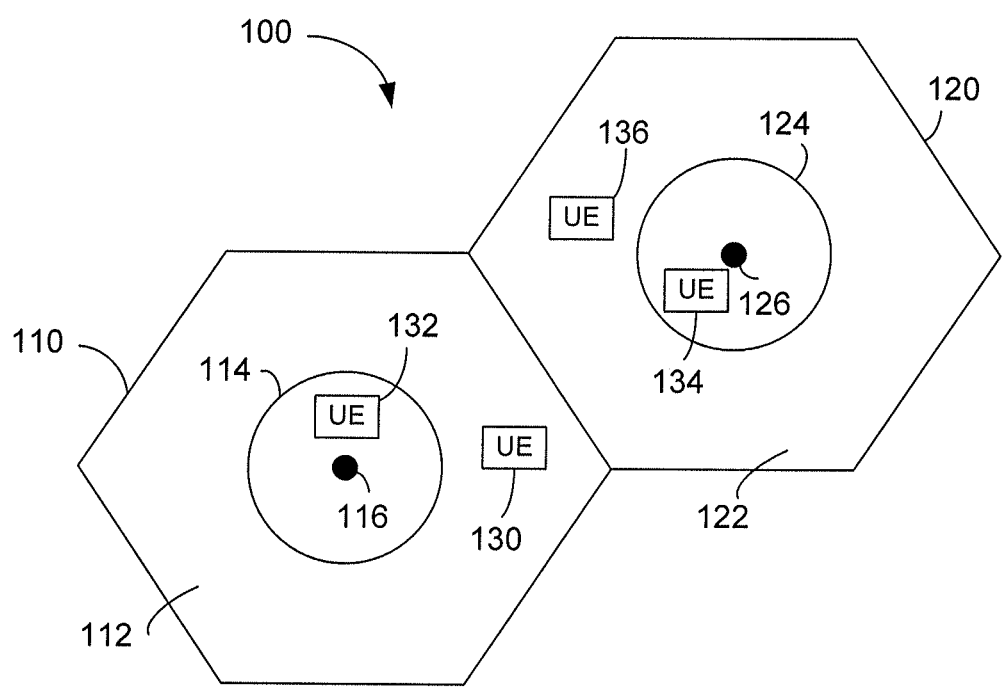
FIG. 1 illustrates a communications system according to example embodiments described herein.

FIG. 1 illustrates a communication system 100. Communication system 100 includes a first enhanced NodeB (eNB) 116 and a second eNB 126. An eNB (also commonly referred to as a base station, communications controller, NodeB, and so forth) usually have a hardware processor that is configured to control communications of User Equipments (UEs) operating within its coverage area. For example, eNB 116 may have a coverage area illustrated in FIG. 1 as hexagon 110, while eNB 126 may have a coverage area illustrated as hexagon 120. Operating within hexagon 110 may be a first UE 130 and a second UE 132. Operating within hexagon 120 may be a third UE 134 and a fourth UE 136. Any of the UEs 130, 132, 134, and 136 may be cell phones, smart phones, tablets, or any electronic device having a hardware processor and hardware antennas capable of wireless communication with the corresponding eNB 116 or 126.

A coverage area of an eNB may be categorized based upon at least one of the following: a distance to the eNB, a terrace, a hill, a high building, or other geological characteristics. For example, coverage area of eNB 116 (i.e., hexagon 110) may be categorized into two regions, with a first region being a cell center region (shown as circle 114) and a cell edge region (portions of hexagon 110 outside of circle 114, shown as region 112). Similarly, overage area of eNB 126 includes a cell center region 124 and a cell edge region 122. The cell center region may also be referred as a safe zone. Normally, UEs operating within the cell center region 114, such as UE 132, may receive less interference from eNB 126 than those UEs operating within the cell edge region 112, such as UE 130, due to their closer proximity to an eNB serving the coverage area. Also, UE 132 in the safe zone receives less inter-cell interference than those outside the safe zone. In this disclosure, the eNB may automatically separate these two types of UEs in the safe zone and in the cell edge region. In a network, there may be over 60% of the UEs should be in the safe zone. Therefore, to reduce system overhead, it may be unnecessary to measure the interference over UEs in the safe zone and apply the sophistical and complex interference cancellation algorithms on them.

In an LTE communication system, eNB includes an LTE network device. The LET network device may be in an LTE receiver in a base station. A conventional LTE network device directly transmits the received signals, channel coefficients, and interference-plus-noise. Also, a conventional LTE network device needs to perform channel estimation and equalization again after the interference is cancelled. Thus, the conventional LTE network device has to increase its processing capability to tackle with the increasing number of the cooperative cells. Besides, if an interference cancellation is required, all of information about this UE, the raw signals, channel coefficients, and covariance matrix should be held in the system until the interference is constructed by the other UEs. This requires huge memory and very fast latency requirement, which may be the bottleneck to have high performance LTE network. Equalization and interference cancellation are of the most complex algorithms in the LTE network device. In a conventional LET network device, these algorithms should be implemented on the single devise, usually a DSP. This requires a very powerful DSP to handle them.

The instant disclosure provides a novel LTE network device that transmits the forward-only pre-calculated metrics. The novel LTE network device does not need to perform channel estimation and equalization again after the interference is cancelled. For example, the novel LTE network device may distribute the equalization and interference cancellation over multiple-level digital signal processors (DSPs) or SoC setups. Further the novel LTE network device may work in a hierarchical architecture by adding independent computing node or inserting another signal processing center at a higher level to address a large number of cooperative cells. Accordingly, UE in the safe zone may be decoded at a level-0 signal processing center while UE outside the safe zone may be decoded at a level-1 signal processing center.

Figure 2:
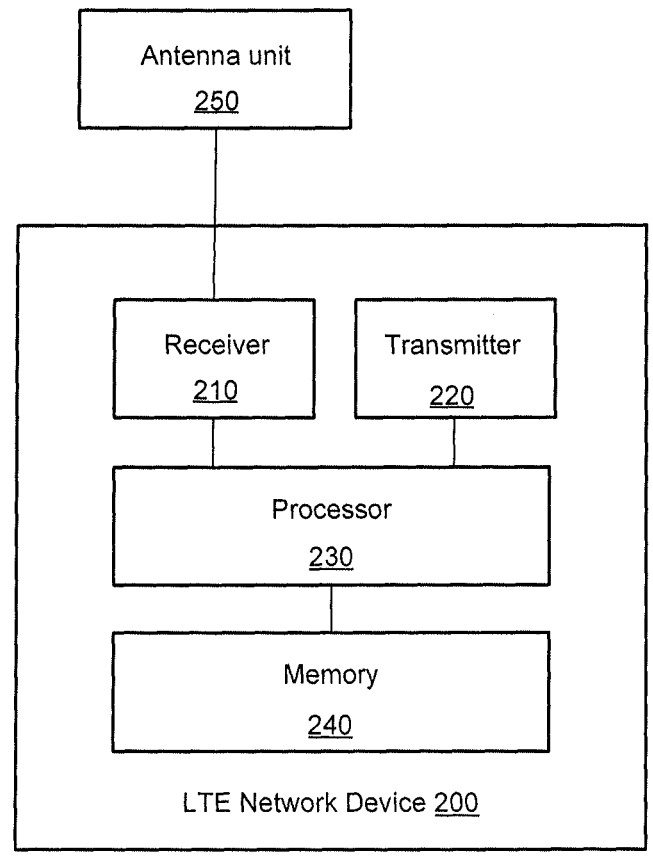
FIG. 2 illustrates an LTE network device according to example embodiments described herein.

FIG. 2 illustrates an LTE network device 200 according to example embodiments described herein. The LTE network device 200 includes a hardware processor 230 and a memory storage 240 that is accessible to the hardware processor 230. The hardware processor 230 may include a plurality of DSPs. The hardware processor 230 is coupled with a receiver 210 and a transmitter 220. The receiver 210 is connected with an antenna unit 250. The antenna unit 250 may include a plurality of antennas. The receiver 210 is configured to receive signals, estimate channel coefficients over the antenna, and a covariance matrix of interference-plus-noise from a plurality of UEs or terminals over antennas. The processor 230 is configured to calculate a plurality of metrics based on the received raw signals, channel coefficients, and a covariance matrix of interference-plus-noise. The transmitter 220 is configured to transmit the calculated metrics to a next-level signal processing center.

In a conventional LTE network device, the signals from the Rx antennas are received signals (y), channel coefficients (H), the covariance matrix of the interference-plus-noise ($R_{uu}$). The equalizer may use the H and $R_{uu}$ to build up a detector to equalize the signal (y). In an embodiment of this disclosure, the processor 230 in an LTE network device is configured to calculate a plurality of metrics based on the received raw signals (y), channel coefficients (H), the covariance matrix of interference-plus-noise ($R_{uu}$). For example, a first metric may be calculated according to the following equation.

$$\langle UE_m, UE_n \rangle_{tone, \hat{R}_{uu}(RB, TTI)} = \underbrace{\hat{H}_{tone}(UE_m)^H}_{1 \times N_r} \cdot \underbrace{\hat{R}_{uu}(RB, TTI)^{-1}}_{N_r \times N_r} \cdot \underbrace{\hat{H}_{tone}(UE_n)}_{N_r \times 1} \quad \text{Equation 1}$$

In the above equation, $N_r$ is the number of receiving antenna ports in the LTE network device. $\hat{H}_{tone}(UE_m)$ is $N_r \times 1$ complex-valued vector of the channel coefficient of $UE_m$ estimated on each receiving antenna port. $R_{uu,tone}$ is a $N_r \times N_r$ complex-valued (hermitian) covariance matrix of the interference-plus-noise. $N_t$ is the number of transmitting antenna ports in the LTE network device.

A second metric may be calculated according to the following equation.

$$\langle UE_m \rangle_{tone, \hat{R}_{uu}(RB, TTI)} = \underbrace{\hat{H}_{tone}(UE_m)^H}_{1 \times N_r} \cdot \underbrace{\hat{R}_{uu}(RB, TTI)^{-1}}_{N_r \times N_r} \cdot \underbrace{y_{tone}}_{N_r \times 1} \quad \text{Equation 2}$$

$y_{tone}$ is a $N_r \times 1$ complex-valued vector of the received signals from the $N_r$ antenna ports. The $N_t \times 1$ complex-valued vector of the detected signals $\hat{x}_{tone}$ may be calculated according to the following equation.

In a SU-MIMO system, only one UE is allocated for RB. The complex-valued vector of the detected signals may be calculated using the following equation.

$$\hat{x}_{tone}(UE_0) = \frac{\langle UE_0 \rangle_{tone,\hat{R}_{uu}(RB,TTI)}}{1 + \langle UE_0, UE_0 \rangle_{tone,\hat{R}_{uu}(RB,TTI)}} \quad \text{Equation 3}$$

With the first and second metrics, when two UEs are allowed to share one resource block (RB) in a V-MIMO system. The complex-valued vector of the detected signals may be calculated using the following equation.

Equation 4

$$\hat{x}_{tone}(UE_0, UE_1) =$$

$$\left[I + \begin{bmatrix} \langle UE_0, UE_0 \rangle_{tone,\hat{R}_{uu}(RB,TTI)} & \langle UE_0, UE_1 \rangle_{tone,\hat{R}_{uu}(RB,TTI)} \\ \langle UE_0, UE_1 \rangle_{tone,\hat{R}_{uu}(RB,TTI)}^* & \langle UE_1, UE_1 \rangle_{tone,\hat{R}_{uu}(RB,TTI)} \end{bmatrix}\right]^{-1} \cdot$$

$$\begin{bmatrix} \langle UE_0 \rangle_{tone,\hat{R}_{uu}(RB,TTI)} \\ \langle UE_1 \rangle_{tone,\hat{R}_{uu}(RB,TTI)} \end{bmatrix}$$

Intra-Cell Interference Cancellation

When $N_i+1$ UEs are associated to a specific eNodeB and share the same RB, one of them is our interested UE and the other $N_i$ UEs are interfering UEs that are successfully decoded. The system model is:

$$y_{tone}(UE_m) = \hat{H}_{tone}(UE_m) \cdot x_{tone}(UE_m) = \sum_{n=0}^{N_i-1} \hat{H}_{tone}(UE_n) \cdot x_{tone}(UE_n) + u_{tone} \quad \text{Equation 5}$$

where $UE_m$ is interested UE and $u_{tone}$ is the interference-plus-noise measured from the remaining power of the received signals after the signals of $UE_m$ and of $N_i$ interfering UEs are subtracted.

The LTE network device 200 may implement an interference-cancellation (IC) algorithm configured to construct the interferences by an encoder and then remove them directly from the received signals $y_{tone}$:

$$y'_{tone} = y_{tone} - g_{tone} = \hat{H}_{tone}(UE_m) \cdot x_{tone}(UE_m) + \quad \text{Equation 6}$$

$$\underbrace{\hat{\Theta}_{tone}(UE_m) \cdot X_{tone}(UE_m) - g_{tone}(UE_m) + u_{tone}}_{u'_{tone}(UE_m)}$$

$$X_{tone}(UE_m) = [x_{tone}(UE_0) \ldots x_{tone}(UE_n) \ldots x_{tone}(UE_{N_i-1})]^T,$$

$n \neq m$ is a $N_i \times 1$ complex-valued vector of the transmitted signals of the $N_i$ interfering UEs on the tone;

$\hat{X}_{tone}(UE_m) = [\hat{x}_{tone}(UE_0) \ldots \hat{x}_{tone}(UE_n) \ldots \hat{x}_{tone}(UE_{N_i-1})]^T$, $n \neq m$ is a $N_i \times 1$ complex-valued vector of the signals encoded from the bits coming from the $N_i$ interfering UEs;

$\hat{\Theta}_{tone}(UE_m) = [\hat{H}_{tone}(UE_0) \ldots \hat{H}_{tone}(UE_n) \ldots \hat{H}_{tone}(UE_{N_i-1})]$, $n \neq m$ is a $N_r \times N_i$ complex-valued matrix of the channel coefficients of the $N_i$ interfering UEs;

$$g_{tone}(UE_m) = \underbrace{\hat{\Theta}_{tone}(UES)}_{N_r \times N_i} \cdot \underbrace{\tilde{X}_{tone}(UES)}_{N_i \times 1} \text{ is a } N_r \times 1$$

complex-valued vector of the summation of the constructed interferences;

In an embodiment, $X_{tone}(UE_m)$ is approximated by:

$\tilde{X}_{tone}(UE_m) = [\tilde{x}_{tone}(UE_0) \ldots \tilde{x}_{tone}(UE_n) \ldots \tilde{x}_{tone}(UE_{N_i-1})]^T$, $n \neq m$ is a $N_i \times 1$ complex-valued vector of the signals of the $N_i$ interfering UEs that have been detected in the serving cell by Equation 4.

The residual interference-plus-noise $u'_{tone}(UE_m)$ is:

$$u'_{tone}(UE_m) = \underbrace{\hat{\Theta}_{tone}(UE_m) \cdot (\hat{X}_{tone}(UE_m) - \tilde{X}_{tone}(UE_m))}_{e_{tone}(UE_m)} + u_{tone} \quad \text{Equation 7}$$
$$\underbrace{\phantom{xxxxxxxxxxxxxxxxxxxxxxxxxxxxxxxxxxxx}}_{v_{tone}(UE_m)}$$

Because $e_{tone}(UE_m)$ and $u_{tone}$ are independent to each other, the covariance matrix of the interference-plus-noise of $u'_{tone}(UE_m)$ is:

$$\hat{R}'_{uu}(UE_m) = \hat{R}_{uu}(RB,TTI) + v_{tone}(UE_m) \cdot v_{tone}(UE_m)^H \quad \text{Equation 8}$$

$\hat{R}_{uu}(RB, TTI)$ is the covariance of the interference-plus-noise that is measured on the remaining signal power after the signals of $UE_m$ and of $N_i$ interfering UEs are subtracted. As shown in Equation 8, the estimation error ($e_{tone}(UE_m)$) on the feedback signals from the interfering UEs increases the interference plus noise. If the interferences are perfectly constructed i.e. zero estimation error, the interference-plus-noise covariance keeps unchanged.

Apply the Sheman-Morrison formula to Equation 8:

$$\hat{R}'_{uu}(UE_m)^{-1} = \hat{R}_{uu}(RB, TTI)^{-1} - \quad \text{Equation 9}$$

$$\frac{\hat{R}_{uu}(RB, TTI)^{-1} \cdot \hat{\Theta}_{tone}(UES) \cdot e_{tone}(UES) \cdot e_{tone}(UES)^H \cdot \hat{\Theta}_{tone}(UES)^H \cdot \hat{R}_{uu}(RB, TTI)^{-1}}{1 + e_{tone}(UES)^H \cdot \hat{\Theta}_{tone}(UES)^H \cdot \hat{R}_{uu}(RB, TTI)^{-1} \cdot \hat{\Theta}_{tone}(UES) \cdot e_{tone}(UES)}$$

Before applying $\hat{R}'_{uu}(UE_m)^{-1}$ to Equation 3 to obtain $\hat{x}'_{tone}(UE_m)$, let's define the following intermediate vectors and matrix in term of $UE_m$, RB, and TTI:

$$\Omega_{tone}(UE_m, RB, TTI) = \hat{H}_{tone}(UE_m)^H \cdot \hat{R}_{uu}(RB, TTI)^{-1} \cdot \hat{\Theta}_{tone}(UE_m) =$$

$$\frac{\left[\langle UE_m, UE_l \rangle_{tone,\hat{R}_{uu}(RB,TTI)}\right]_{0 \leq l < N_i, l \neq m}}{1 \times N_i}$$

$$\Psi_{tone}(UE_m, RB, TTI) = \hat{\Theta}_{tone}(UE_m)^H \cdot \hat{R}_{uu}(RB, TTI)^{-1} \cdot \hat{\Theta}_{tone}(UE_m) =$$

$$\frac{\left[\langle UE_k, UE_l \rangle_{tone,\hat{R}_{uu}(RB,TTI)}\right]_{\substack{0 \leq k < N_i, k \neq m \\ 0 \leq l < N_i, l \neq m}}}{N_i \times N_i}$$

$$\Lambda_{tone}(UE_m, RB, TTI) = \hat{\Theta}_{tone}(UE_m)^H \cdot \hat{R}_{uu}(RB, TTI)^{-1} \cdot y_{tone} =$$

$$\frac{\left[\langle UE_l \rangle_{tone,\hat{R}_{uu}(RB,TTI)}\right]_{0 \leq l < N_i, l \neq m}}{N_i \times 1}$$

The denominator of Equation 3 is:

$$1 + \hat{H}_{tone}(UE_m)^H \cdot \hat{R}'_{uu}(UE_m)^{-1} \cdot \hat{H}_{tone}(UE_m) = \quad \text{Equation 10}$$

$$1 + \langle UE_m, UE_m \rangle_{tone,\hat{R}_{uu}(RB,TTI)} -$$

$$\frac{\Omega_{tone}(UE_m, RB, TTI) \cdot e_{tone}(UE_m) \cdot e_{tone}(UE_m)^H \cdot \Omega_{tone}(UE_m, RB, TTI)^H}{1 + e_{tone}(UE_m)^H \cdot \Psi_{tone}(UE_m, RB, TTI) \cdot e_{tone}(UE_m)}$$

The numerator of Equation 3 is:

$$\hat{H}_{tone}(UE_m)^H \cdot \hat{R}'_{uu}(UE_m)^{-1} \cdot y'_{tone} =$$
$$\hat{H}_{tone}(UE_m)^H \cdot \hat{R}'_{uu}(UE_m)^{-1} \cdot y_{tone} - \hat{H}_{tone}(UE_m)^H \cdot$$
$$\hat{R}'_{uu}(UE_m)^{-1} \cdot g_{tone}(UE_m) = \langle UE_m \rangle_{tone, \hat{R}_{uu}(RB,TTI)} -$$
$$\frac{\Omega_{tone}(UE_m, RB, TTI) \cdot e_{tone}(UE_m) \cdot}{1 + e_{tone}(UE_m)^H \cdot \Psi_{tone}(UE_m, RB, TTI) \cdot e_{tone}(UE_m)} -$$
$$\frac{\Omega_{tone}(RB, TTI) \cdot \tilde{x}_{tone}(UE_m)}{1 + e_{tone}(UE_m)^H \cdot \Psi_{tone}(UE_m, RB, TTI) \cdot e_{tone}(UE_m)}$$

Equation 11

The new estimation $\hat{x}'_{tone}(UE_m)$ of $UE_m$ on this tone the after the interferences are removed is:

$$\hat{x}'_{tone}(UE_m) =$$
$$\frac{\langle UE_m \rangle_{tone, \hat{R}_{uu}(RB,TTI)} + \varphi(\tilde{X}_{tone}(UE_m))}{1 + \langle UE_m, UE_m \rangle_{tone, \hat{R}_{uu}(RB,TTI)} + \varepsilon(\tilde{X}_{tone}(UE_m))}$$

Equation 12 where $$\varphi(\tilde{X}_{tone}(UE_m)) =$$
$$\langle UE_m \rangle_{tone, \hat{R}_{uu}(RB,TTI)} \cdot e_{tone}(UE_m)^H \cdot \Psi_{tone}(UE_m, RB, TTI) \cdot$$
$$e_{tone}(UE_m) - \Omega_{tone}(UE_m, RB, TTI) \cdot e_{tone}(UE_m) \cdot$$
$$e_{tone}(UE_m)^H \cdot \Lambda_{tone}(UE_m, RB, TTI) -$$
$$\Omega_{tone}(UE_m, RB, TTI) \cdot \tilde{x}_{tone}(UE_m);$$

And $$\varepsilon(\tilde{X}_{tone}(UE_m)) =$$
$$e_{tone}(UE_m)^H \cdot \Psi_{tone}(UE_m, RB, TTI) \cdot e_{tone}(UE_m) +$$
$$\langle UE_m, UE_m \rangle_{tone, \hat{R}_{uu}(RB,TTI)} \cdot e_{tone}(UE_m)^H \cdot$$
$$\Psi_{tone}(UE_m, RB, TTI) \cdot e_{tone}(UE_m) -$$
$$\Omega_{tone}(UE_m, RB, TTI) \cdot e_{tone}(UE_m) \cdot$$
$$e_{tone}(UE_m)^H \cdot \Omega_{tone}(UE_m, RB, TTI)^H;$$

Equation 12 is a general formula of the intra-cell IC algorithm. In one embodiment, one interested UE $UE_m$ and one interfering UE $UE_n$ ($N_i=1$) are allowed. Whenever either of the paired UEs is successfully decoded, the successful UE will be regarded as interfering one for interference construction. Accordingly, the aforementioned intermediate vectors and matrix are reduced to scalars:

$\Omega_{tone}(UE_m, RB, TTI) = \langle UE_m, UE_n \rangle_{tone, \hat{R}_{uu}(RB,TTI)}$ $\Psi_{tone}(UE_m, RB, TTI) = \langle UE_n, UE_n \rangle_{tone, \hat{R}_{uu}(RB,TTI)}$ $\Lambda_{tone}(UE_m, RB, TTI) = \langle UE_n \rangle_{\hat{R}_{uu}(RB,TTI)}$ $\tilde{X}(UE_m) = \tilde{x}_{tone}(UE_n)$ the frequency domain (FD) signals that are generated from $\tilde{x}_{tone}(UE_n)$: they are fed to the channel decoder to have decoded bits and encoded, modulated, and converted back to the frequency domain.

$\hat{X}_{tone}(UE_m) = \hat{x}_{tone}(UE_n)$ is the estimated symbols by Equation 4;

$e_{tone}(UE_m) = e_{tone}(UE_n)$

Thus,
Equation 12 is represented:

$$\hat{x}'_{tone}(UE_m) = \frac{\langle UE_m \rangle_{tone, \hat{R}_{uu}(RB,TTI)} + \varphi(\tilde{x}_{tone}(UE_n))}{1 + \langle UE_m, UE_m \rangle_{tone, \hat{R}_{uu}(RB,TTI)} + \varepsilon(\tilde{x}_{tone}(UE_n))}$$

Equation 13 where $$\varphi(\tilde{x}_{tone}(UE_n)) = |e_{tone}(UE_n)|^2 \cdot [$$
$$\langle UE_n, UE_n \rangle_{tone, \hat{R}_{uu}(RB,TTI)} \cdot \langle UE_m \rangle_{tone, \hat{R}_{uu}(RB,TTI)} -$$
$$\langle UE_m, UE_n \rangle_{tone, \hat{R}_{uu}(RB,TTI)} \cdot \langle UE_n \rangle_{\hat{R}_{uu}(RB,TTI)}] -$$
$$\langle UE_m, UE_n \rangle_{tone, \hat{R}_{uu}(RB,TTI)} \cdot \tilde{x}_{tone}(UE_n);$$

$$\varepsilon(\tilde{x}_{tone}(UE_n)) = |e_{tone}(UE_n)|^2 \cdot [\langle UE_n, UE_n \rangle_{tone, \hat{R}_{uu}(RB,TTI)} +$$
$$\langle UE_m, UE_m \rangle_{tone, \hat{R}_{uu}(RB,TTI)} \cdot \langle UE_n, UE_n \rangle_{tone, \hat{R}_{uu}(RB,TTI)} -$$
$$\|\langle UE_m, UE_n \rangle_{tone, \hat{R}_{uu}(RB,TTI)}\|];$$

In an embodiment, the IC algorithm is iterative: only $e_{tone}(UE_n)$ and $\hat{x}_{tone}(UE_n)$ are updated each time. For instance, in the third iteration, they are:

$$\begin{cases} e_{tone}(UE_n) = \hat{x}'_{tone}(UE_n) - \tilde{x}'_{tone}(UE_n) \\ \tilde{x}_{tone}(UE_n) = \tilde{x}'_{tone}(UE_n) \end{cases}$$

The others are computed at the first iteration and kept unchanged. The receiver does not save the received signals and repeat the channel estimation and equalization.

Inter-Cell Interference Cancellation

In an embodiment, the UEs of the neighbor cells introduce the inter-cell interferences on a serving cell, the system model is the following:

$$y_{tone}(UE_m) = \hat{H}_{tone}(UE_m) \cdot x_{tone}(UE_m) + \underbrace{\underbrace{\sum_{n \neq m} \hat{H}_{tone}(UE_n) \cdot x_{tone}(UE_n) + n_{tone}}_{interference}}_{u_{tone}}$$

Equation 14 where $UE_m$ is the interested UE and $UE_n$ is interfering UE on the tone; $n_{tone}$ is white noise. Although the number of the total interfering UEs is unknown, the number of the interfering UEs that provide the feedbacks from the neighbor cells is known as $N_i$:

$$y'_{tone} = \hat{H}_{tone}(UE_m) \cdot x_{tone}(UE_m) + \underbrace{u_{tone} - g_{tone}(UE_m)}_{u'_{tone}(UE_m)}$$

Equation 15 where $u_{tone}$ is the interference-plus-noise measured from the remaining signal power after the signals of $UE_m$ are subtracted;

$u'_{tone}(UE_m)$ is the residual interference-plus-noise after the interferences of $N_i$ interfering UEs are subtracted;

$\hat{X}_{tone}(UE_m) = [\hat{x}_{tone}(UE_0) \ldots \hat{x}_{tone}(UE_n) \ldots \hat{x}_{tone}(UE_{N_i-1})]^T$, $n \neq m$ is a $N_i \times 1$ complex-valued vector of the signals encoded from the bits coming from the $N_i$ interfering UEs.

$\hat{\Theta}_{tone}(UE_m) = [\hat{H}_{tone}(UE_0) \ldots \hat{H}_{tone}(UE_n) \ldots \hat{H}_{tone}(UE_{N_i-1})]$, $n \neq m$ is a $N_r \times N_i$ complex-valued matrix of the channel coefficients of the $N_i$ interfering UEs; they have been estimated by the serving cell;

$$g_{tone}(UE_m) = \underbrace{\hat{\Theta}_{tone}(UEs)}_{N_r \times N_i} \cdot \underbrace{\tilde{X}_{tone}(UEs)}_{N_i \times 1}$$

is a $N_r \times 1$ complex-valued vector of the summation of the constructed interferences;

$U_{tone}(UE_m) = \{UE_0, \ldots UE_{N_i-1}\}$ is the union of the interfering UEs;

Analyze the residual interference-plus-noise $u'_{tone}(UE_m)$:

$$u'_{tone}(UE_m) = u_{tone}(UE_m) - g_{tone}(UE_m) = \Sigma n \neq U_{tone}(UE_m)$$
$$\hat{H}_{tone}(UE_n) \cdot x_{tone}(UE_n) + n_{tone} \quad \text{Equation 16}$$

$u'_{tone}(UE_m)$ includes the white noise ($n_{tone}$) and the remaining interferences. The remaining interferences are due to the UEs that interfere this tone but don't feedback their bits to the serving cell. Because the interfering UEs belong to different cells and because of the law of the large number, the remaining interferences shall be orthogonal and uncorrelated with the constructed interferences $g_{tone}(UE_m)$. It explains why the interference-plus-noise covariance decreases with the subtraction of the interferences:

$$\hat{R}'_{uu}(UE_m) = \hat{R}_{uu}(RB,TTI) - g_{tone}(UE_m) \cdot g_{tone}(UE_m)^H \quad \text{Equation 17}$$

Apply the Sheman-Morrison formula to Equation 17 again:

$$\hat{R}'_{uu}(UE_m)^{-1} = \hat{R}_{uu}(RB,TTI)^{-1} + \quad \text{Equation 18}$$

$$\frac{\hat{R}_{uu}(RB,TTI)^{-1} \cdot \hat{\Theta}_{tone}(UEs) \cdot \tilde{X}_{tone}(UEs) \cdot}{1 - \tilde{X}_{tone}(UEs)^H \cdot \hat{\Theta}_{tone}(UEs)^H \cdot}$$

$$\hat{R}_{uu}(RB,TTI)^{-1} \cdot \hat{\Theta}_{tone}(UEs) \cdot \tilde{X}_{tone}(UEs)$$

The denominator of Equation 3 is:

$$1 + \hat{H}_{tone}(UE_m)^H \cdot \hat{R}'_{uu}(UE_m)^{-1} \cdot \hat{H}_{tone}(UE_m) = \quad \text{Equation 19}$$
$$1 + \langle UE_m, UE_m \rangle_{tone, \hat{R}_{uu}(RB,TTI)} +$$
$$\frac{\Omega_{tone}(UE_m, RB, TTI) \cdot \tilde{X}_{tone}(UE_m) \cdot}{\tilde{X}_{tone}(UE_m)^H \cdot \Omega_{tone}(UE_m, RB, TTI)^H}$$
$$\frac{}{1 - \tilde{X}_{tone}(UE_m)^H \cdot}$$
$$\Psi_{tone}(UE_m, RB, TTI) \cdot \tilde{X}_{tone}(UE_m)$$

The numerator of Equation 3 is:

$$\hat{H}_{tone}(UE_m)^H \cdot \hat{R}'_{uu}(UE_m)^{-1} \cdot y'_{tone} = \quad \text{Equation 20}$$
$$\hat{H}_{tone}(UE_m)^H \cdot \hat{R}'_{uu}(UE_m)^{-1} \cdot y_{tone} - \hat{H}_{tone}(UE_m)^H \cdot$$
$$\hat{R}'_{uu}(UE_m)^{-1} \cdot g_{tone}(UE_m) = \langle UE_m \rangle_{tone, \hat{R}_{uu}(RB,TTI)} +$$
$$\Omega_{tone}(UE_m, RB, TTI) \cdot \tilde{X}_{tone}(UE_m) \cdot$$
$$\frac{\tilde{X}_{tone}(UE_m)^H \cdot \Lambda_{tone}(UE_m, RB, TTI)}{1 - \tilde{X}_{tone}(UE_m)^H \cdot} -$$
$$\Psi_{tone}(UE_m, RB, TTI) \cdot \tilde{X}_{tone}(UE_m)$$

$$\frac{\Omega_{tone}(RB, TTI) \cdot \tilde{X}_{tone}(UE_m)}{1 - \tilde{X}_{tone}(UE_m)^H \cdot}$$
$$\Psi_{tone}(UE_m, RB, TTI) \cdot \tilde{X}_{tone}(UE_m)$$

After the interferences are removed, the updated estimation of $UE_m$ on this tone is:

$$\hat{\tilde{x}}'_{tone}(UE_m) = \quad \text{Equation 21}$$

$$\frac{\langle UE_m \rangle_{tone, \hat{R}_{uu}(RB,TTI)} - \varphi(\hat{\tilde{X}}_{tone}(UE_m))}{1 + \langle UE_m, UE_m \rangle_{tone, \hat{R}_{uu}(RB,TTI)} - \varepsilon(\tilde{X}_{tone}(UE_m))}$$

where $$\varphi(\tilde{X}_{tone}(UE_m)) =$$
$$\langle UE_m \rangle_{tone, \hat{R}_{uu}(RB,TTI)} \cdot \tilde{X}_{tone}(UE_m)^H \cdot \Psi_{tone}(UE_m, RB, TTI) \cdot$$
$$\tilde{X}_{tone}(UE_m) - \Omega_{tone}(UE_m, RB, TTI) \cdot \tilde{X}_{tone}(UE_m) \cdot$$
$$\tilde{X}_{tone}(UE_m)^H \cdot \Lambda_{tone}(UE_m, RB, TTI) +$$
$$\Omega_{tone}(UE_m, RB, TTI) \cdot \tilde{X}_{tone}(UE_m);$$

and $$\varepsilon(\tilde{X}_{tone}(UE_m)) =$$
$$\tilde{X}_{tone}(UE_m)^H \cdot \Psi_{tone}(UE_m, RB, TTI) \cdot \tilde{X}_{tone}(UE_m) +$$
$$\langle UE_m, UE_m \rangle_{tone, \hat{R}_{uu}(RB,TTI)} \cdot \tilde{X}_{tone}(UE_m)^H \cdot$$
$$\Psi_{tone}(UE_m, RB, TTI) \cdot \tilde{X}_{tone}(UE_m) -$$
$$\Omega_{tone}(UE_m, RB, TTI) \cdot \tilde{X}_{tone}(UE_m) \cdot$$
$$\tilde{X}_{tone}(UE_m)^H \cdot \Omega_{tone}(UE_m, RB, TTI)^H;$$

Equation 21 represents a parallel interference cancellation (PIC) algorithm that is configured to outperform the Sequential-IC algorithm. Further, Equation 7 automatically updates the inversed matrix of $R_{uu}$.

In an embodiment, $\Omega_{tone}$, $\Psi_{tone}$, and $\Lambda_{tone}$ are built up from the pre-calculated ingredient metrics which bring about several advantages. First, the LTE network device does not need to store the received signals $y_{tone}$. Further, the LTE network device does not need to do channel estimation and equalization again. The LTE network device only need to calculate $\epsilon(\tilde{X}_{tone}(UE_m))$ and $\epsilon(\tilde{X}_{tone}(UE_m))$ by using the metrics. Thus, the LTE network device does not need to measure the interference-plus-noise or to inverse the covariance matrix again.

MMSE/IRC/CoMP Equalization

In CoMP mode, more than one cell cooperates and contributes to decoding one UE. Any UE is registered or associated to one of the cooperative cells, which are called serving cells. In an embodiment, the number of the Rx antennas of a UE receiver increases with the number of the cooperative cells ($N_{co}$).

MU-Comp

The first CoMP mode that we are going to investigate is MU-CoMP: more than one UE is in the system on a RB.

Define a group of cooperative cells: $Cell_k^{(1)}$ that contains $N_{co}$ cells ($Cell_{k[0]}^{(0)}, Cell_{k[1]}^{(0)}, \ldots Cell_{k[N_{co}-1]}^{(0)}$). To identify the cooperative level, let's add level-0 to natural cell and level-I for its cell group:

$\hat{H}_{tone}^{(0)}(UE_m, Cell_x^{(0)})$ is a $N_r \times 1$ complex-valued vector of channel coefficients of $UE_m$ on the tone estimated by the $Cell_x^{(0)}$; $UE_m$ is not necessarily associated to $Cell_x^{(0)}$;

$y_{tone}^{(0)}(Cell_x^{(0)})$ is a $N_r \times 1$ complex-valued vector of received signals on the tone captured by the Rx antennas of $Cell_x^{(0)}$;

$\hat{R}_{uu}^{(0)}(RB, TTI, Cell_{k,x}^{(0)})$ is a $N_r \times N_r$ covariance matrix of the interference-plus-noise on the RB measured by the receiver of the $Cell_x^{(0)}$, after the signals power of all UEs that are associated to the cell group $Cell_k^{(1)}$ are subtracted. (y is allowed to equal to x.)

$$\langle UE_m, UE_n \rangle_{tone, \hat{R}_{uu}^{(0)}(RB,TTI,Cell_{k,x}^{(0)})} = \underbrace{\hat{H}_{tone}^{(0)}(UE_m, Cell_x^{(0)})^H}_{1 \times N_r} \cdot$$

$$\underbrace{\hat{R}_{uu}^{(0)}(RB, TTI, Cell_{k,x}^{(0)})^{-1}}_{N_r \times N_r} \cdot \underbrace{\hat{H}_{tone}^{(0)}(UE_n, Cell_x^{(0)})}_{N_r \times 1}, UE_m \in Cell_k^{(1)}$$

$$\langle UE_m \rangle_{tone, \hat{R}_{uu}^{(0)}(RB,TTI,Cell_{k,x}^{(0)})} = \underbrace{\hat{H}_{tone}^{(0)}(UE_m, Cell_x^{(0)})^H}_{1 \times N_r} \cdot$$

$$\underbrace{\hat{R}_{uu}^{(0)}(RB, TTI, Cell_{k,x}^{(0)})^{-1}}_{N_r \times N_r} \cdot \underbrace{y_{tone}^{(0)}(Cell_x^{(0)})}_{N_r \times 1}, UE_m \in Cell_k^{(1)}$$

Now that $N_{co} \cdot N_r$ antennas capture the signals for a UE in a cell-group $Cell_k^{(1)}$, its channel estimation, received signals, and covariance matrix of the interference-plus-noise is extended to $(N_{co} \cdot N_r)$ dimension as well:

$$\hat{H}_{tone}^{(1)}(UE_m, Cell_k^{(1)}) = \begin{bmatrix} \hat{H}_{tone}^{(0)}(UE_m, Cell_{k[0]}^{(0)}) \\ \vdots \\ \hat{H}_{tone}^{(0)}(UE_m, Cell_{k[N_{co}-1]}^{(0)}) \end{bmatrix}_{N_{co} \cdot N_r \times 1} \quad y_{tone}^{(1)}(Cell_k^{(1)}) =$$

$$\begin{bmatrix} y_{tone}^{(0)}(Cell_{k[0]}^{(0)}) \\ \vdots \\ y_{tone}^{(0)}(Cell_{k[N_{co}-1]}^{(0)}) \end{bmatrix}_{N_{co} \cdot N_r \times 1}$$

In an embodiment, because the antennas of $Cell_{k[x]}^{(0)}$ and those of $Cell_{k[y]}^{(0)}$ are separated and uncorrelated, the joint level-I covariance matrix of the interference-plus-noise $\hat{R}_{uu}^{(1)}(RB, TTI, Cell_{k,t}^{(1)})$ may be approximated by a diagonal matrix for its better performance and lower complexity. To be more general, $\hat{R}_{uu}^{(1)}(RB, TTI, Cell_{k,t}^{(1)})$ is designated to covariance matrix of the interference-plus-noise on the RB of the UEs that are associated to $Cell_k^{(1)}$ but measured by the receivers ($Cell_{t[i]}^{(0)}$) of the cell group $Cell_t^{(1)}$. Here, the cell group $Cell_t^{(1)}$ may be the same cell-group k: $Cell_k^{(1)}$.

$$\hat{R}_{uu}^{(1)}(RB, TTI, Cell_{k,t}^{(1)})^{-1} =$$

$$\begin{bmatrix} \hat{R}_{uu}^{(0)}\begin{pmatrix} RB, TTI, \\ Cell_{k,t[0]}^{(0)} \end{pmatrix}^{-1} & \cdots & 0 \\ \vdots & \ddots & \vdots \\ 0 & \cdots & \hat{R}_{uu}^{(0)}\begin{pmatrix} RB, TTI, \\ Cell_{k,t[N_{co}-1]}^{(0)} \end{pmatrix}^{-1} \end{bmatrix}_{(N_{co} \cdot N_r) \times (N_{co} \cdot N_r)}$$

Note that there is only one $\hat{R}_{uu}^{(1)}(RB, TTI, Cell_{k,t}^{(1)})$ on a RB that indicates the interference-plus-noise of $Cell_k^{(1)}$ measured by $Cell_t^{(1)}$.

It is proved that as a banded matrix $\hat{R}_{uu}^{(1)}(RB, TTI, Cell_{k,t}^{(1)})$:

$$\hat{R}_{uu}^{(1)}(RB, TTI, Cell_{k,t}^{(1)})^{-1} = \quad \text{Equation 22}$$

$$\begin{bmatrix} \hat{R}_{uu}^{(0)}\begin{pmatrix} RB, TTI, \\ Cell_{k,t[0]}^{(0)} \end{pmatrix}^{-1} & \cdots & 0 \\ \vdots & \ddots & \vdots \\ 0 & \cdots & \hat{R}_{uu}^{(0)}\begin{pmatrix} RB, TTI, \\ Cell_{k,t[N_{co}-1]}^{(0)} \end{pmatrix}^{-1} \end{bmatrix}$$

Define the inner-production on the joint interference-plus-noise space ($UE_n$ is associated to $Cell_k^{(1)}$):

$$\langle UE_m, UE_n \rangle_{tone, \hat{R}_{uu}^{(1)}(RB,TTI,Cell_{k[x],k}^{(1)})} =$$

$$\underbrace{\hat{H}_{tone}^{(1)}(UE_m, Cell_k^{(1)})^H}_{1 \times N_{co} \cdot N_r} \cdot \underbrace{\hat{R}_{uu}^{(1)}(RB, TTI, Cell_{k,k}^{(1)})^{-1}}_{(N_{co} \cdot N_r) \times (N_{co} \cdot N_r)} \cdot \underbrace{\hat{H}_{tone}^{(1)}(UE_n, Cell_k^{(1)})}_{N_{co} \cdot N_r \times 1} =$$

$$\sum_{y=0}^{N_{co}-1} \langle UE_m, UE_n \rangle_{tone, \hat{R}_{uu}^{(0)}(RB,TTI,Cell_{k,k[y]}^{(0)})}$$

$$\langle UE_m \rangle_{tone, \hat{R}_{uu}^{(1)}(RB,TTI,Cell_{k[x],k}^{(1)})} =$$

$$\underbrace{\hat{H}_{tone}^{(1)}(UE_m, Cell_k^{(1)})^H}_{1 \times N_{co} \cdot N_r} \cdot \underbrace{\hat{R}_{uu}^{(1)}(RB, TTI, Cell_{k,k}^{(1)})^{-1}}_{(N_{co} \cdot N_r) \times (N_{co} \cdot N_r)} \cdot \underbrace{y_{tone}^{(1)}(UE_n, Cell_k^{(1)})}_{N_{co} \cdot N_r \times 1} =$$

$$\sum_{y=0}^{N_{co}-1} \langle UE_m \rangle_{tone, \hat{R}_{uu}^{(0)}(RB,TTI,Cell_{k,k[y]}^{(0)})}$$

On a cooperative level, the number of the paired UEs is increased along with $N_{co}$. In worst case, there are $2 \cdot N_{co}$ paired UEs multiplexed on a RB so that the MMSE/IRC detector needs to inverse a $2 \cdot N_{co} \times 2 \cdot N_{co}$ matrix.

For example, if three cell are grouped as cooperative cell and only SU-MIMO is considered, we have the MMSE/IRC detector on the level-I:

$$\hat{x}_{tone}(UE_0, UE_1, UE_2) = \quad \text{Equation 23}$$

$$\begin{bmatrix} 1 + \begin{bmatrix} \langle UE_0, UE_0 \rangle_{tone,\hat{R}_{uu}^{(1)}(RB,TTI,Cell_{k,k}^{(1)})} & \langle UE_0, UE_1 \rangle_{tone,\hat{R}_{uu}^{(1)}(RB,TTI,Cell_{k,k}^{(1)})} & \langle UE_0, UE_2 \rangle_{tone,\hat{R}_{uu}^{(1)}(RB,TTI,Cell_{k,k}^{(1)})} \\ \langle UE_0, UE_1 \rangle_{tone,\hat{R}_{uu}^{(1)}(RB,TTI,Cell_{k,k}^{(1)})}^* & \langle UE_1, UE_1 \rangle_{tone,\hat{R}_{uu}^{(1)}(RB,TTI,Cell_{k,k}^{(1)})} & \langle UE_1, UE_2 \rangle_{tone,\hat{R}_{uu}^{(1)}(RB,TTI,Cell_{k,k}^{(1)})} \\ \langle UE_0, UE_2 \rangle_{tone,\hat{R}_{uu}^{(1)}(RB,TTI,Cell_{k,k}^{(1)})}^* & \langle UE_1, UE_2 \rangle_{tone,\hat{R}_{uu}^{(1)}(RB,TTI,Cell_{k,k}^{(1)})}^* & \langle UE_2, UE_2 \rangle_{tone,\hat{R}_{uu}^{(1)}(RB,TTI,Cell_{k,k}^{(1)})} \end{bmatrix} \end{bmatrix}^{-1} \begin{bmatrix} \langle UE_0 \rangle_{tone,\hat{R}_{uu}^{(1)}(RB,TTI,Cell_{k,k}^{(1)})} \\ \langle UE_1 \rangle_{tone,\hat{R}_{uu}^{(1)}(RB,TTI,Cell_{k,k}^{(1)})} \\ \langle UE_2 \rangle_{tone,\hat{R}_{uu}^{(1)}(RB,TTI,Cell_{k,k}^{(1)})} \end{bmatrix}$$

where all three UE are associated to the same $Cell_k^{(1)}$.

SU-CoMP

In SU-CoMP mode, although more than one cell cooperates and contributes to decoding one UE, the upper level receiver assumes that there is only one UE in the system on a RB. In some cases, SU-CoMP is a sub-optimal solution of MU-CoMP.

The differences lie in the definition of $\hat{R}_{uu}^{(0)}$ and metrics:

$\hat{R}_{uu}^{(0)}(RB, TTI, Cell_{x,y}^{(0)})$ is a $N_r \times N_r$ covariance matrix of the interference-plus-noise on the RB of a UE that is associated to $Cell_x^{(0)}$ but measured by the receiver of the $Cell_y^{(0)}$. (y is allowed to equal to x.)

$$\langle UE_m, UE_n \rangle_{tone, \hat{R}_{uu}^{(0)}(RB,TTI,Cell_{x,y}^{(0)})} = \underbrace{\hat{H}_{tone}^{(0)}(UE_m, Cell_y^{(0)})^H}_{1 \times N_r} \cdot$$

$$\underbrace{\hat{R}_{uu}^{(0)}(RB, TTI, Cell_{x,y}^{(0)})^{-1}}_{N_r \times N_r} \cdot \underbrace{\hat{H}_{tone}^{(0)}(UE, Cell_y^{(0)})}_{N_r \times 1}, UE_m \in Cell_x^{(0)}$$

$$\langle UE_m \rangle_{tone, \hat{R}_{uu}^{(0)}(RB,TTI,Cell_{x,y}^{(0)})} = \underbrace{\hat{H}_{tone}^{(0)}(UE_m, Cell_y^{(0)})^H}_{1 \times N_r} \cdot$$

$$\underbrace{\hat{R}_{uu}^{(0)}(RB, TTI, Cell_{x,y}^{(0)})^{-1}}_{N_r \times N_r} \cdot \underbrace{y_{tone}^{(0)}(Cell_y^{(0)})}_{N_r \times 1}, UE_m \in Cell_x^{(0)}$$

For the reason mentioned, the joint level-I covariance matrix of the interference-plus-noise $\hat{R}_{uu}^{(1)}(RB, TTI, Cell_{k[x],t}^{(1)})$ is approximated by a diagonal matrix for its better performance and lower complexity. To be more general, $\hat{R}_{uu}^{(1)}(RB, TTI, Cell_{k[x],t}^{(1)})$ is designated to a covariance matrix of the interference-plus-noise on the RB of the UEs that are associated to $Cell_{k[x]}^{(0)}$ but measured by the receivers of the cell group $Cell_t^{(1)}$. Here, Here, the cell group $Cell_t^{(1)}$ may be the same cell-group $k:Cell_k^{(1)}$.

$$\hat{R}_{uu}^{(1)}(RB, TTI, Cell_{k[x],t}^{(1)}) =$$

$$\begin{bmatrix} \hat{R}_{uu}^{(0)}\begin{pmatrix} RB, TTI, \\ Cell_{k[x],t[0]}^{(0)} \end{pmatrix} & \cdots & 0 \\ \vdots & \ddots & \vdots \\ 0 & \cdots & \hat{R}_{uu}^{(0)}\begin{pmatrix} RB, TTI, \\ Cell_{k[x],t[N_{co}-1]}^{(0)} \end{pmatrix} \end{bmatrix}^{-1}_{(N_{co} \cdot N_r) \times (N_{co} \cdot N_r)}$$

Note that there are $N_{co}$ of $\hat{R}_{uu}^{(1)}(RB, TTI, Cell_{k[x],t}^{(1)})$ on a RB that indicate the interference-plus-noise of $Cell_{k[x]}^{(0)}$ measured by $Cell_t^{(1)}$.

It is proved that as a banded matrix $\hat{R}_{uu}^{(1)}(RB, TTI, Cell_{k[x],t}^{(1)})$:

$$\hat{R}_{uu}^{(1)}(RB, TTI, Cell_{k[x],t}^{(1)})^{-1} = \quad \text{Equation 24}$$

$$\begin{bmatrix} \hat{R}_{uu}^{(0)}(RB, TTI, Cell_{k[x],t[0]}^{(0)})^{-1} & \cdots & 0 \\ \vdots & \ddots & \vdots \\ 0 & \cdots & \hat{R}_{uu}^{(0)}(RB, TTI, Cell_{k[x],t[N_{co}-1]}^{(0)})^{-1} \end{bmatrix}$$

If the $UE_m$ is associated to $Cell_{k[x]}^{(0)}$, the MMSE/IRC detector on $(N_{co} \cdot N_r)$ dimension is represented:

$$\hat{x}_{tone}(UE_m) = \frac{\hat{H}_{tone}^{(1)}(UE_m, Cell_k^{(1)})^H \cdot \hat{R}_{uu}^{(1)}(RB, TTI, Cell_{k[x],k}^{(1)})^{-1} \cdot y_{tone}^{(1)}(Cell_k^{(1)})}{1 + \hat{H}_{tone}^{(1)}(UE_m, Cell_k^{(1)})^H \cdot \hat{R}_{uu}^{(1)}(RB, TTI, Cell_{k[x],k}^{(1)})^{-1} \cdot y_{tone}^{(1)}(Cell_k^{(1)})} \quad \text{Equation 25}$$

Define the inner-production on the joint interference-plus-noise space ($UE_n$ is not necessarily associated to $Cell_{k[x]}^{(0)}$):

$$\langle UE_m, UE_n \rangle_{tone, \hat{R}_{uu}^{(1)}(RB,TTI,Cell_{k[x],k}^{(1)})} =$$

$$\underbrace{\hat{H}_{tone}^{(1)}(UE_m, Cell_k^{(1)})^H}_{1 \times N_{co} \cdot N_r} \cdot \underbrace{\hat{R}_{uu}^{(1)}(RB, TTI, Cell_{k[x],k}^{(1)})^{-1}}_{(N_{co} \cdot N_r) \times (n_{co} \cdot N_r)} \cdot \underbrace{\hat{H}_{tone}^{(1)}(UE_n, Cell_k^{(1)})}_{N_{co} \cdot N_r \times 1} =$$

$$\sum_{y=0}^{N_{co}-1} \langle UE_m, UE_n \rangle_{tone, \hat{R}_{uu}^{(0)}(RB,TTI,Cell_{k[x],k[y]}^{(0)})}$$

$$\langle UE_m, UE_n \rangle_{tone, \hat{R}_{uu}^{(1)}(RB,TTI,Cell_{k[x],k}^{(1)})} =$$

$$\underbrace{\hat{H}_{tone}^{(1)}(UE_m, Cell_k^{(1)})^H}_{1 \times N_{co} \cdot N_r} \cdot \underbrace{\hat{R}_{uu}^{(1)}(RB, TTI, Cell_{k[x],k}^{(1)})^{-1}}_{(N_{co} \cdot N_r) \times (n_{co} \cdot N_r)} \cdot \underbrace{y_{tone}^{(1)}(Cell_k^{(1)})}_{N_{co} \cdot N_r \times 1} =$$

$$\sum_{y=0}^{N_{co}-1} \langle UE_m \rangle_{tone, \hat{R}_{uu}^{(0)}(RB,TTI,Cell_{k[x],k[y]}^{(0)})}$$

Substitute the level-I metrics into Equation 21:

$$\hat{x}_{tone}(UE_m) = \frac{\langle UE_m \rangle_{tone, \hat{R}_{uu}^{(1)}(RB,TTI,Cell_{k[x],k}^{(1)})}}{1 + \langle UE_m, UE_m \rangle_{tone, \hat{R}_{uu}^{(1)}(RB,TTI,Cell_{k[x],k}^{(1)})}} \quad \text{Equation 26}$$

where $UE_m$ is associated to $Cell_{k[x]}^{(0)}$.

Substitute the level-I metrics into Equation 4:

$$\hat{x}_{tone}(UE_m, UE_n) = \quad \text{Equation 27}$$

$$\left[ I + \begin{bmatrix} \langle UE_m, UE_m \rangle_{tone, \hat{R}_{uu}^{(1)}(RB,TTI,Cell_{k[x],k}^{(1)})} & \langle UE_m, UE_n \rangle_{tone, \hat{R}_{uu}^{(1)}(RB,TTI,Cell_{k[x],k}^{(1)})} \\ \langle UE_m, UE_n \rangle_{tone, \hat{R}_{uu}^{(1)}(RB,TTI,Cell_{k[x],k}^{(1)})}^* & \langle UE_n, UE_n \rangle_{tone, \hat{R}_{uu}^{(1)}(RB,TTI,Cell_{k[x],k}^{(1)})} \end{bmatrix} \right]^{-1}$$

$$\cdot \begin{bmatrix} \langle UE_m \rangle_{tone, \hat{R}_{uu}^{(1)}(RB,TTI,Cell_{k[x],k}^{(1)})} \\ \langle UE_n \rangle_{tone, \hat{R}_{uu}^{(1)}(RB,TTI,Cell_{k[x],k}^{(1)})} \end{bmatrix}$$

where both $UE_m$ and $UE_n$ that are paired V-MIMO associated to the same $Cell_{k[x]}^{(0)}$.

CoMP on Upper Level

The CoMP may be easily extended to the upper level. For example, define a cell-group $Cell_k^{(1)} = \{Cell_{k[0]}^{(0)}, Cell_{k[1]}^{(0)}, \ldots Cell_{k[N_{co}-1]}^{(0)}\}$, and the other group $Cell_l^{(1)} = \{Cell_{l[0]}^{(0)}, Cell_{l[1]}^{(0)}, \ldots Cell_{l[N_{co}-1]}^{(0)}\}$. Enable the two cell groups to form a next level group $(Cell_{kl}^{(2)} = \{Cell_{kl[0]}^{(1)}(=Cell_k^{(1)}), Cell_{kl[1]}^{(1)}(=Cell_l^{(1)})\})$. For a given $UE_m$ that is associated to $Cell_{k[x]}^{(0)}$:

$$\hat{H}_{tone}^{(2)}(UE_m, Cell_{kl}^{(2)}) = \begin{bmatrix} \hat{H}_{tone}^{(1)}(UE_m, Cell_k^{(1)}) \\ \hat{H}_{tone}^{(1)}(UE_m, Cell_l^{(1)}) \end{bmatrix} =$$

$$\begin{bmatrix} \hat{H}_{tone}^{(0)}(UE_m, Cell_{k[0]}^{(0)}) \\ \vdots \\ \hat{H}_{tone}^{(0)}(UE_m, Cell_{k[N_{co}-1]}^{(0)}) \\ \hat{H}_{tone}^{(0)}(UE_m, Cell_{l[0]}^{(0)}) \\ \vdots \\ \hat{H}_{tone}^{(0)}(UE_m, Cell_{l[N_{co}-1]}^{(0)}) \end{bmatrix}_{(2 \times N_{co} \cdot N_r) \times 1}$$

-continued $$y_{tone}^{(2)}(Cell_{kl}^{(2)}) = \begin{bmatrix} y_{tone}^{(1)}(Cell_k^{(1)}) \\ y_{tone}^{(1)}(Cell_l^{(1)}) \end{bmatrix} = \begin{bmatrix} y_{tone}^{(0)}(Cell_{k[0]}^{(0)}) \\ \vdots \\ y_{tone}^{(0)}(Cell_{k[N_{co}-1]}^{(0)}) \\ y_{tone}^{(0)}(Cell_{l[0]}^{(0)}) \\ \vdots \\ y_{tone}^{(0)}(Cell_{l[N_{co}-1]}^{(0)}) \end{bmatrix}_{(2 \times N_{co} \cdot N_r) \times 1}$$

The joint covariance matrix of $UE_m$ is extended to the level-II group $Cell_{kl}^{(2)}$ to form a $(2 \cdot N_{co} \cdot N_r) \times (2 \cdot N_{co} \cdot N_r)$ matrix:

In an embodiment, the joint covariance matrix in MU-CoMP mode:

$$\hat{R}_{uu}^{(2)}(RB, TTI, Cell_{kl,kl}^{(2)}) = \begin{bmatrix} \hat{R}_{uu}^{(1)}(RB, TTI, Cell_{kl,kl[0]}^{(1)}) & 0 \\ 0 & \hat{R}_{uu}^{(1)}(RB, TTI, Cell_{kl,kl[1]}^{(1)}) \end{bmatrix} =$$

$$\begin{bmatrix} \hat{R}_{uu}^{(1)}(RB, TTI, Cell_{kl,k}^{(1)}) & 0 \\ 0 & \hat{R}_{uu}^{(1)}(RB, TTI, Cell_{kl,l}^{(1)}) \end{bmatrix}$$

where $\hat{R}_{uu}^{(1)}(RB, TTI, Cell_{kl,k}^{(1)}) =$ $$\begin{bmatrix} \hat{R}_{uu}^{(0)}(RB, TTI, Cell_{kl,k[0]}^{(0)}) & \cdots & 0 \\ \vdots & \ddots & \vdots \\ 0 & \cdots & \hat{R}_{uu}^{(0)}(RB, TTI, Cell_{kl,k[N_{co}-1]}^{(0)}) \end{bmatrix} \text{ and}$$

$$\hat{R}_{uu}^{(1)}(RB, TTI, Cell_{kl,l}^{(1)}) = \begin{bmatrix} \hat{R}_{uu}^{(0)}(RB, TTI, Cell_{kl,l[0]}^{(0)}) & \cdots & 0 \\ \vdots & \ddots & \vdots \\ 0 & \cdots & \hat{R}_{uu}^{(0)}(RB, TTI, Cell_{kl,l[N_{co}-1]}^{(0)}) \end{bmatrix}.$$

where $\hat{R}_{uu}^{(0)}(RB, TTI, Cell_{kl,x}^{(0)})$ is a $N_r \times N_r$ covariance matrix of the interference-plus-noise on the RB measured by the receiver of the $Cell_x^{(0)}$, after the signals power of all UEs that are associated to the cell group $Cell_{kl}^{(2)}$ are subtracted. $\hat{R}_{uu}^{(2)}(RB, TTI, Cell_{kl,kl}^{(2)})$ is unique on this RB at this kl level.

In an embodiment, the joint covariance matrix in SU-CoMP mode:

$$\hat{R}_{uu}^{(2)}(RB, TTI, Cell_{k[x],kl}^{(2)}) = \begin{bmatrix} \hat{R}_{uu}^{(1)}(RB, TTI, Cell_{k[x],kl[0]}^{(1)}) & 0 \\ 0 & \hat{R}_{uu}^{(1)}(RB, TTI, Cell_{k[x],kl[1]}^{(1)}) \end{bmatrix} =$$

$$\begin{bmatrix} \hat{R}_{uu}^{(1)}(RB, TTI, Cell_{k[x],k}^{(1)}) & 0 \\ 0 & \hat{R}_{uu}^{(1)}(RB, TTI, Cell_{k[x],l}^{(1)}) \end{bmatrix}$$

where $$\hat{R}_{uu}^{(1)}(RB, TTI, Cell_{k[x],k}^{(1)}) = \begin{bmatrix} \hat{R}_{uu}^{(0)}(RB, TTI, Cell_{k[x],k[0]}^{(0)}) & \cdots & 0 \\ \vdots & \ddots & \vdots \\ 0 & \cdots & \hat{R}_{uu}^{(0)}(RB, TTI, Cell_{k[x],k[N_{co}-1]}^{(0)}) \end{bmatrix} \text{ and}$$

$$\hat{R}_{uu}^{(1)}(RB, TTI, Cell_{k[x],l}^{(1)}) = \begin{bmatrix} \hat{R}_{uu}^{(0)}(RB, TTI, Cell_{k[x],l[0]}^{(0)}) & \cdots & 0 \\ \vdots & \ddots & \vdots \\ 0 & \cdots & \hat{R}_{uu}^{(0)}(RB, TTI, Cell_{k[x],l[N_{co}-1]}^{(0)}) \end{bmatrix}.$$

where $\hat{R}_{uu}^{(0)}(RB, TTI, Cell_{k[x],y}^{(0)})$ is a $N_r \times N_r$ covariance matrix of the interference-plus-noise on the RB measured by the receiver of the $Cell_y^{(0)}$, after the signal power of one UE that is associated to the cell group $Cell_{k[x]}^{(0)}$ is subtracted. There are $\hat{R}_{uu}^{(2)}(RB, TTI, Cell_{k[x],kl}^{(2)})$, $x=0, 1, \ldots 2 \cdot N_{co}-1$ on this RB.

The level-II metrics in a MU-CoMP mode are:

$$\langle UE_m, UE_n \rangle_{tone, \hat{R}_{uu}^{(2)}(RB,TTI,Cell_{kl,kl}^{(2)})} =$$

$$\langle UE_m, UE_n \rangle_{tone, \hat{R}_{uu}^{(1)}(RB,TTI,Cell_{kl,k}^{(1)})} + \langle UE_m, UE_n \rangle_{tone, \hat{R}_{uu}^{(1)}(RB,TTI,Cell_{kl,l}^{(1)})}$$

$$\langle UE_m \rangle_{tone, \hat{R}_{uu}^{(2)}(RB,TTI,Cell_{kl,kl}^{(2)})} =$$

$$\langle UE_m \rangle_{tone, \hat{R}_{uu}^{(1)}(RB,TTI,Cell_{kl,k}^{(1)})} + \langle UE_m \rangle_{tone, \hat{R}_{uu}^{(1)}(RB,TTI,Cell_{kl,l}^{(1)})}$$

The level-II metrics in a SU-CoMP mode are:

$$\langle UE_m, UE_n \rangle_{tone, \hat{R}_{uu}^{(2)}(RB,TTI,Cell_{k[x],kl}^{(2)})} =$$

$$\langle UE_m, UE_n \rangle_{tone, \hat{R}_{uu}^{(1)}(RB,TTI,Cell_{k[x],k}^{(1)})} + \langle UE_m, UE_n \rangle_{tone, \hat{R}_{uu}^{(1)}(RB,TTI,Cell_{k[x],l}^{(1)})}$$

$$\langle UE_m \rangle_{tone, \hat{R}_{uu}^{(2)}(RB,TTI,Cell_{k[x],kl}^{(2)})} =$$

$$\langle UE_m \rangle_{tone, \hat{R}_{uu}^{(1)}(RB,TTI,Cell_{k[x],k}^{(1)})} + \langle UE_m \rangle_{tone, \hat{R}_{uu}^{(1)}(RB,TTI,Cell_{k[x],l}^{(1)})}$$

In an embodiment, the CoMP equalization is hierarchically implemented if the metrics are used. The upper level metrics may be built recursively with the lower level ones. SU-CoMP is a suboptimal solution of the MU-CoMP. It limits the dimension of the matrix to be inversed but at the cost of keeping multiple $R_{uu}$.

MMSE/IRC/SU-CoMP/IC Equalization

The benefit of MU-CoMP comes from the MU-MMSE/IRC detector that automatically cancels the interferences among the paired UEs. In fact, the inter-cell interferences on the level-0 ($Cell_{k[0]}^{(0)}, Cell_{k[1]}^{(0)}, \ldots Cell_{k[N_{co}-1]}^{(0)}$) turns to the intra-cell interferences of the level-1 $Cell_k^{(1)}$. Although the IC algorithm can be applied to MU-CoMP mode, the trade-off of its complexity, latency, and possible gain makes it less interesting.

However, applying IC algorithm to SU-CoMP mode does compensate for the disadvantage due to the SU-MMSEIRC detector.

The covariance matrix $\hat{R}_{uu}^{(1)}(RB, TTI, Cell_{k[x],t}^{(1)})$ of the interference-plus-noise on the RB of the $UE_m$ is associated to $Cell_{k[x]}^{(0)}$ but measured by the receivers of the cell group $Cell_t^{(1)}$ (can be the same cell-group k: $Cell_k^{(1)}$). This implies that this interference-plus-noise on the level-I includes the signals of all UEs of $Cell_k^{(1)}$) except the signals of $UE_m$, which justifies Equation 13 rather than Equation 5.

Let's investigate the IC on the level-I cell, $Cell_k^{(1)}$). Assume $UE_m$ belongs to $Cell_{k[x]}^{(0)}$ and $N_i$ ($\leq N_{co}$) interfering UEs that are associated to the other cells $Cell_{k[y]}^{(0)}$, $y \neq x$ but of the same $Cell_k^{(1)}$ feedback their bits for interference construction.

$$y_{tone}^{'(1)}(Cell_k^{(1)}) = \hat{H}_{tone}^{(1)}(UE_m, Cell_k^{(1)}) \cdot x_{tone}(UE_m) + \quad \text{Equation 28}$$

$$\frac{u_{tone}^{(1)}(Cell_k^{(1)}) - g_{tone}^{(1)}(UE_m, Cell_k^{(1)})}{u_{tone}^{'(1)}(UE_m, Cell_k^{(1)})}$$

where $u_{tone}^{(1)}(Cell_k^{(1)})$ is the interference-plus-noise measured from the remaining signal power after the signals of $UE_m$ are subtracted on the $Cell_k^{(1)}$;

$u'_{tone}^{(1)}(UE_m, Cell_k^{(1)})$ is the residual interference-plus-noise after the interferences of $N_i$ interfering UEs are subtracted on the $Cell_k^{(1)}$;

$\tilde{X}_{tone}(UE_m) = [\tilde{x}_{tone}(UE_0) \ldots \tilde{x}_{tone}(UE_n) \ldots \tilde{x}_{tone}(UE_{N_i-1})]_T$, $n \neq m$ is a $N_i \times 1$ complex-valued vector of the signals encoded from the bits coming from the $N_i$ interfering UEs.

$\hat{\Theta}_{tone}^{(1)}(UE_m, Cell_k^{(1)}) = [\hat{H}_{tone}^{(1)}(UE_0, Cell_k^{(1)}) \ldots \hat{H}_{tone}^{(1)}(UE_n, Cell_k^{(1)}) \ldots \hat{H}_{tone}^{(1)}(UE_{N_i-1}, Cell_k^{(1)})]$, $n \neq m$ is a $(N_{co} \cdot N_r) \times N_i$ complex-valued matrix of the channel coefficients of the $N_i$ interfering UEs; they have been estimated by the receivers of the $Cell_k^{(1)}$;

$$g_{tone}^{(1)}(UE_m, Cell_k^{(1)}) = \underbrace{\hat{\Theta}_{tone}^{(1)}(UEs, Cell_k^{(1)})}_{(N_{co} \cdot N_r) \times N_i} \cdot \underbrace{\tilde{x}_{tone}(UEs)}_{N_i \times 1} \text{ is a } (N_{co} \cdot N_r) \times 1$$

complex-valued vector of the summation of the constructed interferences;

$U_{tone}(UE_m) = \{UE_0, \ldots UE_{N_i-1}\}$ is the union of the interfering UEs;

Similar to the covariance matrix of the interference-plus-noise on the level-0, that on the level-I presents as:

$$u'^{(1)}_{tone}(UE_m, Cell_k^{(1)}) = u^{(1)}_{tone}(Cell_k^{(1)}) - g^{(1)}_{tone}(UE_m, Cell_k^{(1)}) = \Sigma_{n \neq} U_{tone}(UE_m)\hat{H}^{(1)}_{tone}(UE_n, Cell_k^{(1)})$$
$$\cdot x_{tone}(UE_n) + n_{tone}$$

Equation 29:

$u'_{tone}(UE_m)$ includes of the white noise ($n_{tone}$) and the remaining interferences. The later one are due to the UEs that interfere this tone but don't feedback their bits to the upper level. Because the interfering UEs belong to different cells (they may or may not belong to $Cell_k^{(1)}$) and because of the law of the large number, the remaining interferences shall be orthogonal to the constructed interferences $g_{tone}^{(1)}(UE_m, Cell_k^{(1)})$ Therefore, the interference-plus-noise covariance decreases with the subtraction of the interferences:

$$\hat{R}'^{(1)}_{uu}(RB,TTI,Cell_{k[x],k}^{(1)}) = \hat{R}^{(1)}_{uu}(RB,TTI,Cell_{k[x],k}^{(1)}) - g_{tone}^{(1)}(UE_m, Cell_k^{(1)}) \cdot g_{tone}^{(1)}(UE_m, Cell_k^{(1)})^H$$

Equation 30:

From then on, apply the IC algorithm to the level-I signals.

$$\Omega_{tone}^{(1)}(UE_m, RB, TTI, Cell_k^{(1)}) =$$

$$\hat{H}_{tone}^{(1)}(UE_m, Cell_k^{(1)})^H \cdot \hat{R}_{uu}^{(1)}(RB, TTI, Cell_{k[x],k}^{(1)})^{-1} \cdot \hat{\Theta}_{tone}^{(1)}(UE_m, Cell_k^{(1)}) =$$

$$\frac{\left[\langle UE_m, UE_l \rangle_{tone, \hat{R}_{uu}^{(1)}(RB,TTI,Cell_{k[x],k}^{(1)})}\right]_{0 \leq l < N_i, l \neq m}}{1 \times N_i}$$

$$\Psi_{tone}^{(1)}(UE_m, RB, TTI, Cell_k^{(1)}) = \hat{\Theta}_{tone}^{(1)}(UE_m, Cell_k^{(1)})^H \cdot \hat{R}_{uu}^{(1)}$$

$$(RB, TTI, Cell_{k[x],k}^{(1)})^{-1} \cdot \hat{\Theta}_{tone}^{(1)}(UE_m, Cell_k^{(1)}) =$$

$$\frac{\left[\langle UE_k, UE_l \rangle_{tone, \hat{R}_{uu}^{(1)}(RB,TTI,Cell_{k[x],k}^{(1)})}\right]_{\substack{0 \leq k < N_i, k \neq m \\ 0 \leq l < N_i, l \neq m}}}{N_i \times N_i}$$

$$\Lambda_{tone}^{(1)}(UE_m, RB, TTI, Cell_k^{(1)}) = \hat{\Theta}_{tone}^{(1)}(UE_m, Cell_k^{(1)})^H \cdot \hat{R}_{uu}^{(1)}$$

$$(RB, TTI, Cell_{k[x],k}^{(1)})^{-1} \cdot y_{tone}^{(1)}(Cell_k^{(1)}) =$$

$$\frac{\left[\langle UE_l \rangle_{tone, \hat{R}_{uu}^{(1)}(RB,TTI,Cell_k^{(1)})}\right]_{0 \leq l < N_i, l \neq m}}{N_i \times 1}$$

The new estimation of $UE_m$ on this tone after the interferences are removed is:

$$\tilde{x}'_{tone}(UE_m) = \frac{\langle UE_m \rangle_{tone, \hat{R}_{uu}^{(1)}(RB,TTI,Cell_{k[x],k}^{(1)})} - \varphi(\tilde{x}_{tone}(UE_m))}{1 + \langle UE_m, UE_m \rangle_{tone, \hat{R}_{uu}^{(1)}(RB,TTI,Cell_{k[x],k}^{(1)})} - \varepsilon(\tilde{x}_{tone}(UE_m))}$$

Equation 31

In an embodiment, $\Omega_{tone}^{(1)}$, $\Psi_{tone}^{(1)}$, and $\Lambda_{tone}^{(1)}$ are built up from the ingredient metrics brings about several advantages. The receiver doesn't need to store the received signals $y_{tone}$. The receiver doesn't need to do channel estimation and equalization again; Instead, it just calculates $\varepsilon(\tilde{X}_{tone}(UE_m))$ and $\varepsilon(\tilde{X}_{tone}(UE_m))$ by using the lower level metrics (addition is enough). Equation 31 is a joint detector with CoMP and PIC. The receiver doesn't need to measure the interference-plus-noise and neither to inverse the covariance matrix again.

Instead of performing the PIC on one level, the successful UE could report its $\tilde{x}_{tone}(UE_n)$ to the upper level on which the unsuccessful UEs would benefit from both the IC and CoMP signals.

Channel Estimation

It is proved that the metrics $\langle UE_m, UE_n \rangle_{tone, \hat{R}_{uu}(RB,TTI)}$ and $\langle UE_m \rangle_{tone, \hat{R}_{uu}(RB,TTI)}$ are the elementary ingredients for the ensuing signal processing. And they are transmitted between implementation components. If the metrics on each tone were transmitted through the bus system of a SoC, they would definitively increase the internal bandwidth. In this section, we are going to prove that only the metrics on the pilot-tone (DMRS) need to be transmitted on the bus. The remaining metrics can be generated from them.

In an embodiment, the channel coefficient on a data tone is interpolated from those on the pilot tone along the time axis. When the pilot tones occupy the No. 3 and No. 10 symbols, the channel coefficient on the data tone may be generated based on the following equation.

$$\hat{H}_{tone}(UE_m) = \beta_{tone} \cdot \hat{H}_{tone=DMRS3}(UE_m) + \gamma_{tone} \cdot \hat{H}_{tone=DMRS10}(UE_m)$$

Equation 32:

where $\beta_{tone}$ and $\gamma_{tone}$ are constants only related to its position.

In fact, $\hat{R}_{uu}(RB, TTI)$ constructs space in which any linear operations are kept valid.

The metrics on the tone are:

$$\langle UE_m, UE_n \rangle_{tone, \hat{R}_{uu}(RB,TTI)} = \hat{H}_{tone}(UE_m)^H \cdot \hat{R}_{uu}(RB, TTI)^{-1} \cdot \hat{H}_{tone}(UE_n) =$$

$$\beta_{tone}^2 \cdot \hat{H}_{tone=DMRS3}(UE_m)^H \cdot \hat{R}_{uu}(RB, TTI)^{-1} \cdot \hat{H}_{tone=DMRS3}(UE_n) +$$

$$\gamma_{tone}^2 \cdot \hat{H}_{tone=DMRS10}(UE_m)^H \cdot \hat{R}_{uu}(RB, TTI)^{-1} \cdot \hat{H}_{tone=DMRS10}(UE_n) +$$

$$\beta_{tone} \cdot \gamma_{tone} \cdot \hat{H}_{tone=DMRS3}(UE_m)^H \cdot$$

$$\hat{R}_{uu}(RB, TTI)^{-1} \cdot \hat{H}_{tone=DMRS10}(UE_n) +$$

$$\beta_{tone} \cdot \gamma_{tone} \cdot \hat{H}_{tone=DMRS10}(UE_m)^H \cdot \hat{R}_{uu}(RB, TTI)^{-1} \cdot \hat{H}_{tone=DMRS3}(UE_n)$$

Thus, it is not necessary to transmit the complete metrics on each tone. In an embodiment, 12 metrics need to be transmitted among 14 received metrics, which further include two Demodulation Pilot Signal (DMRS) that may be used in the uplink signals. For example, The Base-station uses DMRS to do the channel estimation and synchronization. The DMRS may be the training sequences defined by the 3 gpp specifications so that both transmitter and receiver follow. The network device may transmit only 48 (12×4) metric instead of 168 (12×14) metrics on each tone. If it is SU-MIMO and SU-CoMP, it is reduced to 30 (12×2.5) metrics.

Figure 3:
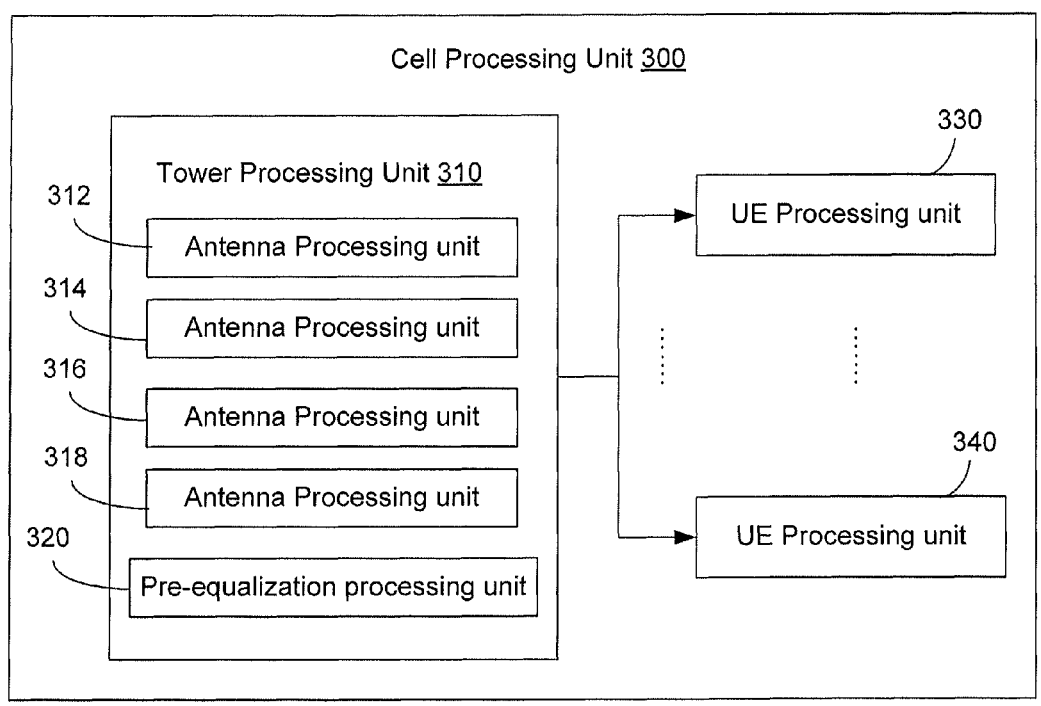
FIG. 3 illustrates an example cell processing unit according to example embodiments described herein.

FIG. 3 illustrates an example cell processing unit 300 according to example embodiments described herein. In this embodiment, the cell processing unit 300 is a single cell equipped with four receiving antennas. The signals on each antenna are processed independently: mainly to convert them into the frequency domain and perform the channel estimation based on the DMRSs. At this stage, they are processed in term of RB index rather than UE index. All of these functions may be implemented in a unit named as "Antenna Processing Unit." The cell processing unit 300 has four antenna processing units 312, 314, 316, and 318.

Following the antenna processing units, the channel coefficients and received signals from the four antenna processing units eventually converge onto a pre-equalization processing unit 320. This pre-equalization processing unit 320 is configured to compute the metrics ($\langle UE_m, UE_n \rangle_{tone, \hat{R}_{uu}(RB,TTI)}$ and $\langle UE_m \rangle_{tone, \hat{R}_{uu}(RB,TTI)}$), i.e. ingredients, reorders them after the UE index instead of RB index, and uploads the metrics on the bus or fibers. The four antenna processing units 312, 314, 316, and 318 and the pre-equalization processing unit make up to a tower processing unit 310.

In an embodiment, all of the signals including the metrics issued from the tower processing unit 310 are all UE-specific. They are used to build up a MMSEIRC detector (Equation 3 and Equation 4) for a particular UE to equalize the signals, to convert them to the time domain, and to demodulate and decode them. All of these functions may be implemented in a processing unit called as "UE Processing Unit."

For example, every Transmission Time Interval (TTI), the tower processing unit 310 is updated of the all-active-UE scheduling information of the Cell$_{k[0]}$, whereas a UE processing unit 330 or 340 is informed of its own scheduling information. The benefit is apparent: it is easier for L2 scheduler to schedule the L1 on UE basis.

The cell processing unit 300 may be implemented using a software implementation or a combination of software and hardware. The connection between the tower processing unit 310 and the UE processing units 330 and 340 may be any type of physical connection, such as chip bus or fiber. The physical connection has to meet a requirement such that the delays over the connection are allowed for a total latency budget.

Figure 4:
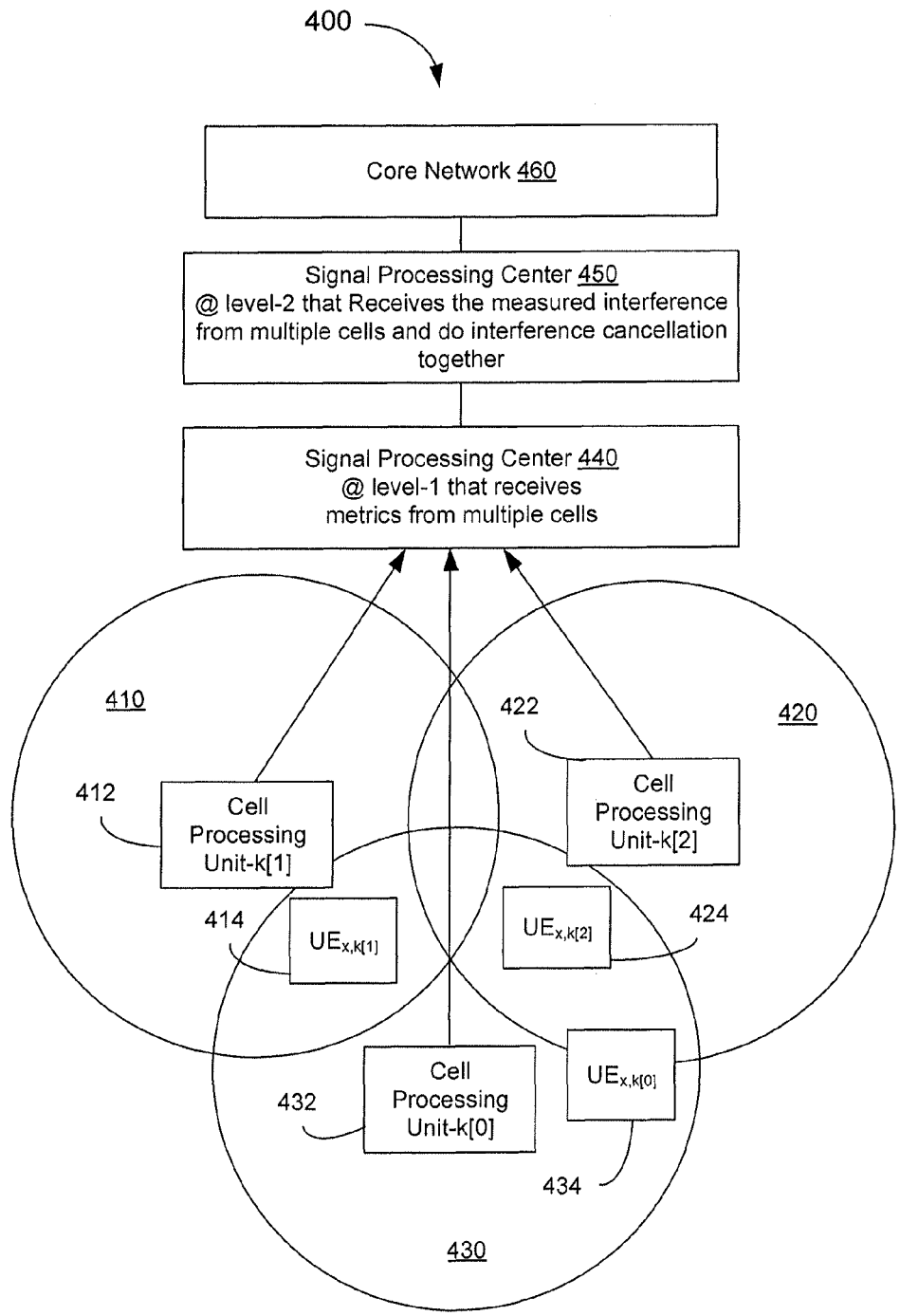
FIG. 4 illustrates a communication system according to example embodiments described herein.

FIG. 4 illustrates a communication system 400 according to example embodiments described herein. The communication system 400 includes a core network 460 connected with a level-2 signal processing center 450 which is also connected with a level-1 signal processing center 440. The level-1 signal processing center 440 receives metrics from multiple cells 410, 420, and 430. Each cell has a cell processing unit dealing with a plurality of UEs.

For example, in cell 410, a cell processing unit 412 deals with a UE 414. In cell 420, a cell processing unit 422 deals with a UE 424. In cell 430, a cell processing unit 432 deals with a UE 434.

In an embodiment, $UE_{x,k[0]}$, $UE_{x,k[1]}$, and $UE_{x,k[2]}$ are associated to $Cell_{k[0]}^{(0)}$, $Cell_{k[1]}^{(0)}$, and $Cell_{k[2]}^{(0)}$ respectively. The metrics related to $UE_{x,k[0]}$ from the three cell processing units 412, 422, and 432 converge into a UE process unit allocated to $UE_{x,k[0]}$ in the cell processing unit 432. If the interfering $UE_{f0}$ and $UE_{f1}$ have been successfully decoded by their own cell processing units 412, 422 and $UE_{x,k[0]}$ has not been decoded by the cell processing unit 432, their interference signals $\tilde{x}_{tone}(UE_{x,k[1]})$ and $\tilde{x}_{tone}(UE_{x,k[2]})$ also feedback to the UE processing unit of $UE_{x,k[0]}$ for an IC processing using Equation 21.

Figure 5:
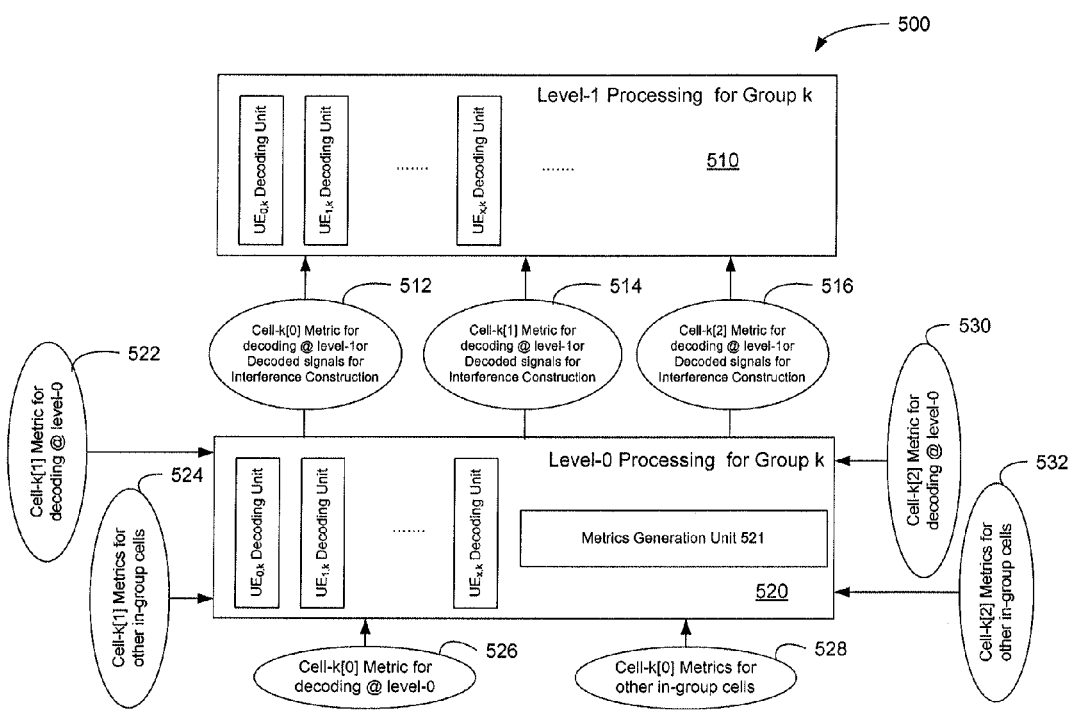
FIG. 5 illustrates a signal processing system according to example embodiments described herein.

FIG. 5 illustrates a signal processing system 500 according to example embodiments described herein.

The signal processing system 500 includes a level-0 signal processing center 520 and a level-1 signal processing center 510. The level-0 signal processing center 520 includes a plurality of UE decoding unit and a metrics generation unit 521 for generating metrics to the level-1 signal processing center 510. The level-0 signal processing center 520 receives pre-calculated metrics input 522, 524, 526, 528, 530, and 532 from corresponding tower processing units that generate these metrics.

The UE decoding unit is configured to decode based on the received metrics input. Although a UE process Unit can decode $UE_{x,k}$ with both cooperative metrics and interferences, $UE_{x,k}$ firstly attempts to decode with the metrics only from its associated cell 526 at the first time. If the decoding fails, the metric generation unit 521 combines its own metric 526 and metrics from cooperative cells 528 into a level-1 metrics 512 for upper level processing center. On the level-1, the same UE processing unit will continue decoding with the level-1 metric and the interference feedbacks if they are available at this moment. The interference feedbacks may be interference cancellation with cooperative information that includes the decoded signal according to Equation 33.

Figure 6A:
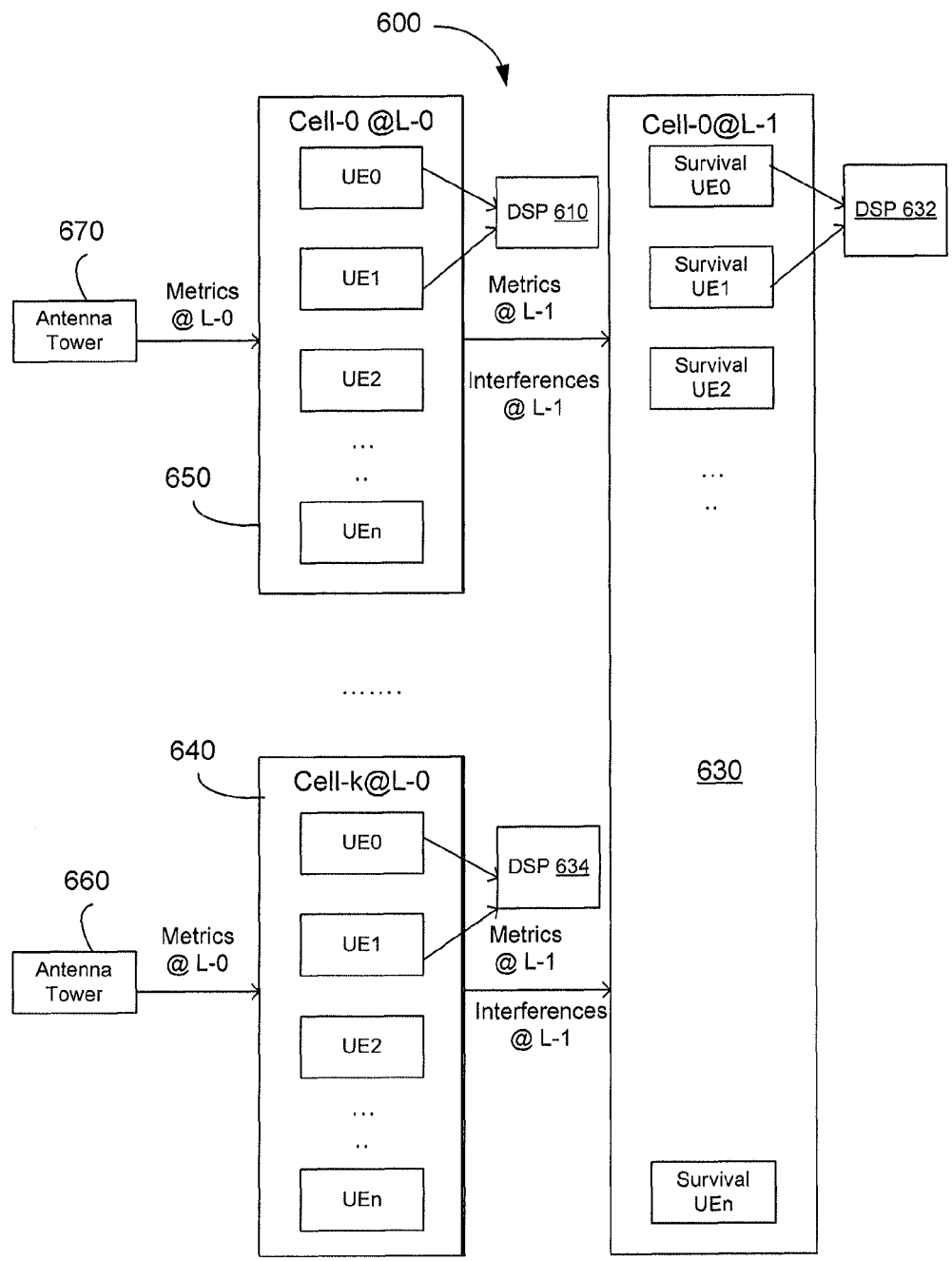
FIG. 6A illustrates a signal processing system according to example embodiments described herein.

FIG. 6A illustrates a signal processing system 600 according to example embodiments described herein. The signal processing system 600 includes a first signal processing center 630 at level-1, a second signal processing center 640, and a third signal processing center 650. Each signal processing center includes a plurality of hardware processors. For example, the first signal processing center 630 includes a DSP device 632. The second signal processing center 640 includes a DSP device 634 and the third signal processing center 650 includes a DSP device 610. The DSP devices may include one or more DSP processors. To reduce power consumption by DSPs, the number of the active UE that one DSP handles simultaneously may be limited. For example, the DSP device 610 is configured to decode at least one of the UE0 and UE1 in cell 0. The signal processing center 650 is connected with an antenna tower 670 and configured to receive a plurality of metrics from an LTE network device in the antenna tower 670 that communicates with the UEs in that cell.

The DSP device 634 is configured to decode at least one of the UE0 and UE1 in cell k. The signal processing center 640 is connected with an antenna tower 660 and configured to receive a plurality of metrics from an LTE network device in the antenna tower 660 that communicates with the UEs in that cell. The plurality of metrics from the antenna towers 660 and 670 are generated based on raw signals, channel coefficients, and a covariance matrix of interference-plus-noise from a plurality of UEs in the cell. Each DSP device may include a decoding unit that includes a decoder configured to decode based on the received plurality of metrics from the antenna towers.

Similar to the UE decoding unit in FIG. 5, the UE decoding units in the signal processing center 650 at level-0 are configured to decode using the metrics from the antenna tower 670. If the decoding is not successful, the signal processing center 650 sends a plurality of metrics to the signal processing center 630 at level-1. Similarly, UE decoding units in the signal processing center 640 at level-0 are configured to decode using the metrics from the antenna tower 660. If the decoding is not successful, the signal processing center 640 sends a plurality of metrics to the signal processing center 630 at level-1.

In the level-0 signal processing center 640 or 650, Equation 3 may be applied to the SU-MIMO UE; while Equation 4 to V-MIMO UEs. Then the level-I metrics are calculated. If one UE is successfully decoded, its bits are encoded to have interference feedback or constructed interference $\tilde{x}_{tone}(UE_I)$. The calculated level-1 metrics and interference signals are uploaded on the bus or fiber and issued to the upper level UE Process Unit in the signal processing center 630.

On the level-I, if there's no interference feedback on this RB, Equation 26 is applied to the SU-MIMO UE, while Equation 27 to V-MIMO UEs. If there are interference feedback on the RB, the $\Omega_{tone}^{(1)}$, $\Psi_{tone}^{(1)}$, and $\Lambda_{tone}^{(1)}$ are built with the level-1 metrics accordingly and used by Equation 31.

The hierarchical architecture can have multiple levels. One of the constraints is the total latency budget. On every level, if a number of UE processing units are deployed in parallel, the latency on one level is constant.

Figure 6B:
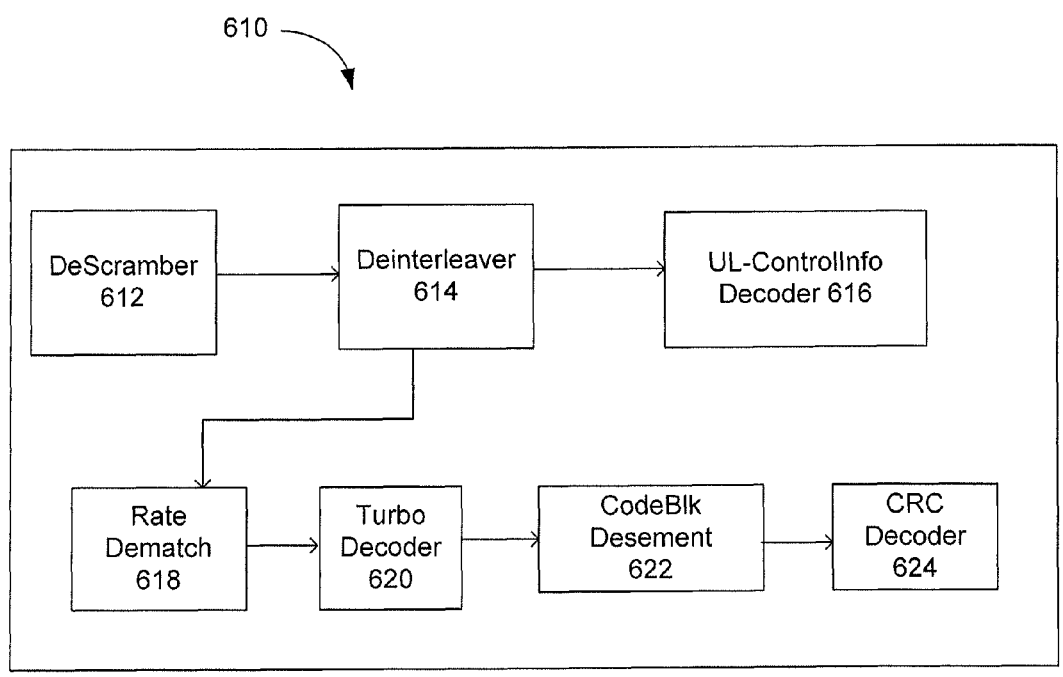
FIG. 6B illustrates a digital signal processing device according to example embodiments described herein.

FIG. 6B illustrates a DSP device 610 according to example embodiments described in FIG. 6A. For example, the DSP device 610 includes a Descrambler 612 connected with a Deinterleaver 614. In the Deinterleaver 614, the interleaved data is arranged back into the original sequence by the Deinterleaver 614. The arranged data from the Deinterleaver 614 is then output to a UL-Controllinfo decoder 616 and a Rate Dematch 618. The Rate Dematch 618 is connected with a Turbo Decoder 620. The Turbo Decoder 620 then outputs the decoded data to a CodeBlk Desement 622 which outputs to the CRC decoder 624.

Figure 7A:
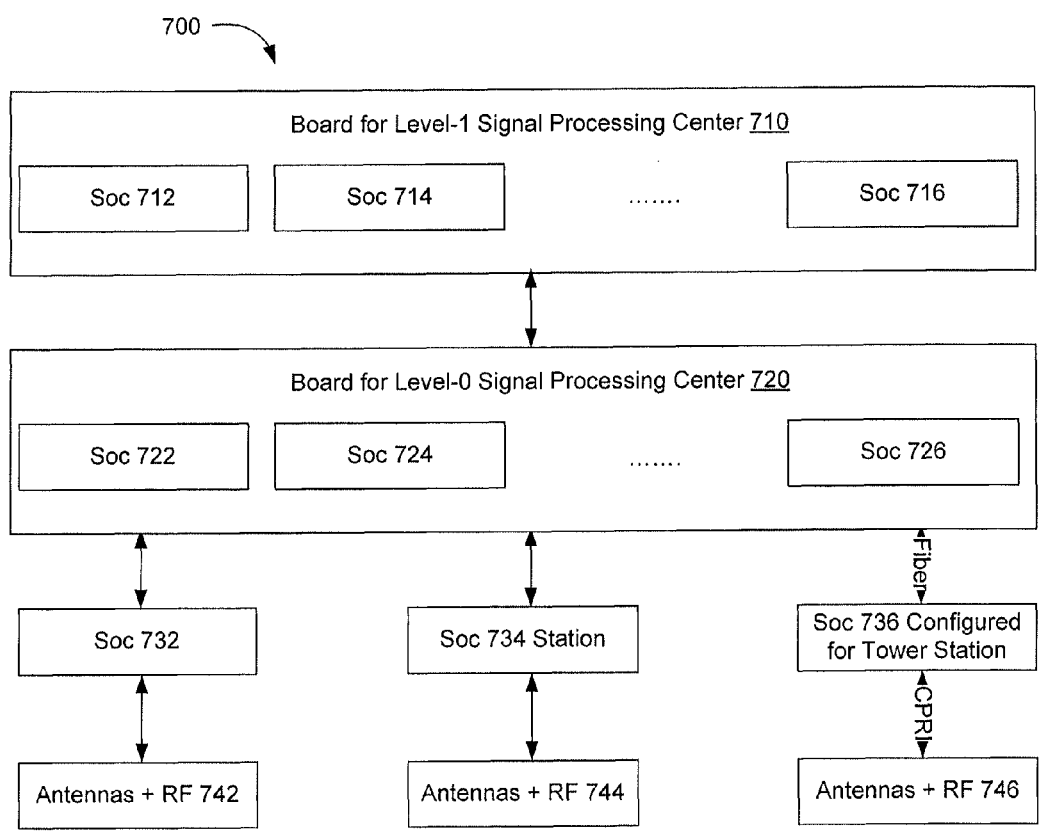
FIG. 7A illustrates an example signal processing system according to example embodiments described herein.

FIG. 7A illustrates an example signal processing system 700 according to example embodiments described herein. The signal processing system 700 includes a plurality of hardware boards. For example, the signal processing system 700 includes a first and second hardware board 710, 720 that respectively implement a level-1 signal processing center and a level-0 signal processing center. The first hardware board 710 includes a plurality of integrated circuits. The integrated circuits may include system on chip (Soc) 712, 714, and 716 configured to decode UEs at level-1. The Soc 712, 714, and 716 may be connected with each other by a communication link. The second hardware board 720 includes a plurality of integrated circuits. The integrated circuits may include Soc 722, 724, and 726 configured to decode UEs at level-0. The Soc 722, 724, and 726 may be connected with each other by a communication link.

The second hardware board 720 may communicate with a plurality of tower stations by a fiber. Each tower station includes a Soc. For example, the second hardware board 720 communicates with Soc 732, 734, and 736 configured to calculate the first and second metrics based on equations 1 and 2. The Soc 732, 734, and 736 respectively communicates with corresponding antennas 742, 744, and 746. The communication link between Soc and antenna may be Common Packet Radio Interface (CPRI), which is a wireless standard Interference Protocol (IP) for high speed data communication that my include a fiber. For example, the CPRI may be a radio interface deployed over the IP.

Figure 7B:
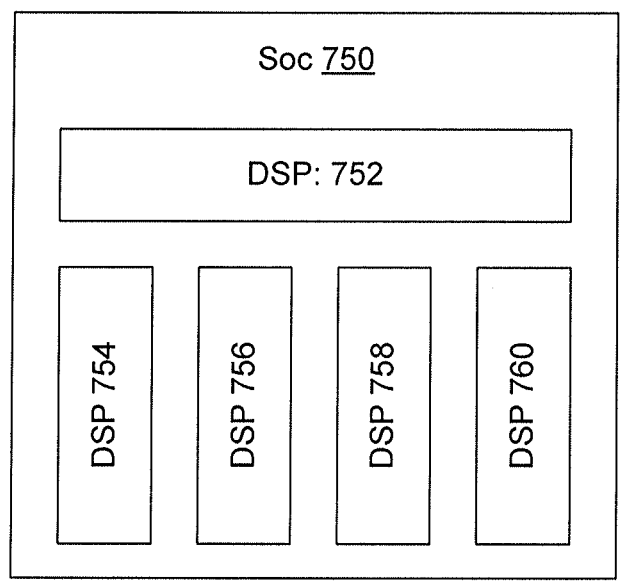
FIG. 7B illustrates an example an integrated circuit chip according to example embodiments described herein.

FIG. 7B illustrates an example an integrated circuit chip 750 according to example embodiments described herein. The integrated circuit chip 750 includes a plurality of DSPs 752, 754, 756, 758, and 760. The plurality of DSPs may be configured to different or similar task. For example, when the Soc is in the first or second hardware board in FIG. 7A, the plurality of DSPs 752, 754, 756, 758, and 760 are configured to decode UE based on the metrics input. When the Soc is in the tower station, the plurality of DSPs 752, 754, 756, 758, and 760 are configured to calculate the metrics and perform other front end tasks.

Figure 8:
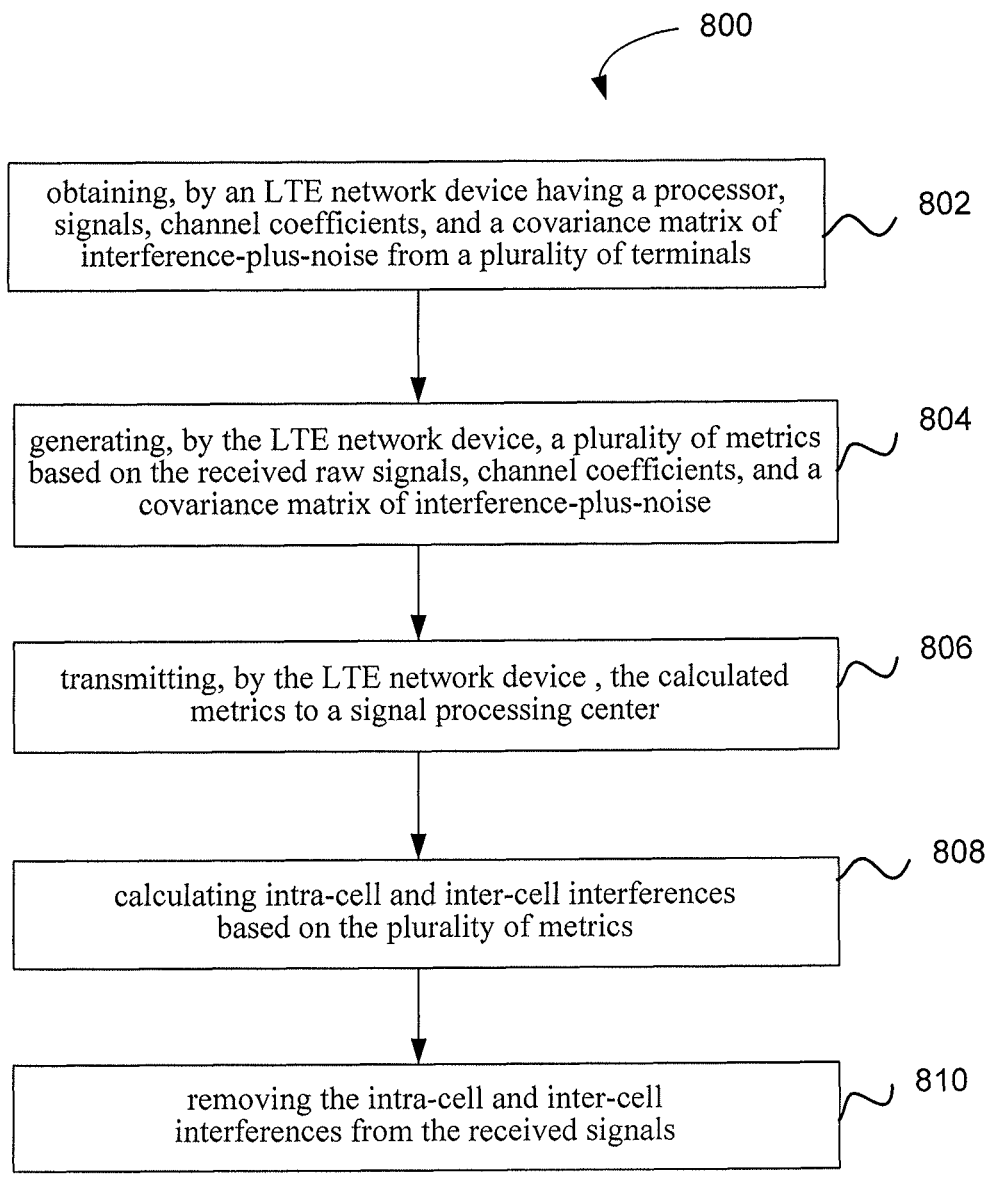
FIG. 8 illustrates an example flow diagram of a method for interference cancellation in a LTE communication system according to example embodiments described herein.

FIG. 8 illustrates an example flow diagram of a method 800 for interference cancellation in a LTE communication system according to example embodiments described herein. The method 800 may be implemented in a LTE network device having a hardware processor. The hardware processor may include at least one DSP processor.

In act 802, the LTE network device obtains signals, channel coefficients, and a covariance matrix of interference-plus-noise from a plurality of UEs. The LTE network device may first receive signals from the plurality of UEs and then obtain the channel coefficients and the covariance matrix of interference-plus-noise based on the received signals. The UEs include any communication terminal that can communicate with the LTE network device.

In act 804, the LTE network device generates a plurality of metrics based on the received raw signals, channel coefficients, and a covariance matrix of interference-plus-noise. The LTE network device may use a plurality of DSP processors or other hardware to generate the metrics.

In act 806, the LTE network device transmits the calculated metrics to a signal processing center for further processing. The LTE network device and the signal processing center may be connected using a fiber network.

In act 808, the LTE network device or the signal processing center calculates intra-cell and inter-cell interferences based on the plurality of metrics. In act 810, the LTE network device or the signal processing center removes the intra-cell and inter-cell interferences from the received signals.

Thus, an advanced detector may be built up from the basic metrics $\langle UE_m, UE_{m'} \rangle_{tone, \hat{R}_{uu}(RB,TTI)}$ and $\langle UE_{m'} \rangle_{tone, \hat{R}_{uu}(RB,TTI)}$. PIC is also achieved by correctly choosing the metrics in term of the feedback UEs. The metrics are hierarchical: the upper level metrics are just summations of the proper lower level ones. In turn, the detector and IC algorithm become hierarchical as well. All matches the evolution of LTE specifications.

Scheduling algorithm is facing two issues: on one hand, it prefers processing UE independently; on other hand, it prefers scheduling a specific group of UEs jointly. Therefore, some scheduling functions are implemented closer to UE; others are closer to network. And the scheduler spends lots in grouping the UEs by some rules that requires L1 to frequently measure the channel quality.

A hierarchical architecture brings about a hierarchical scheduling algorithm. UEs are automatically grouped based on their channel quality. As a result, more than 50% UEs lie closer to the Rx antennas so that they can be decoded successfully without any interference cancellation and contributions from the cooperative cells. In another word, they are decoded only on the level-0 in our architecture. Some remaining UEs (we denote them as survival UE) will get decoded with the help of IC and CoMP on the level-1. Fewer remaining ones are decoded on the level-2. By this way, the scheduling algorithm can decrease its focus on the UEs with poorer channel quality, that is, those decoded on the upper levels.

In a "flat" solution, the signals captured from different cell are processed on a piece of equipment and the maximum number of the UEs is limited by this equipment's capacity. However, LTE and its evolution require more diverse markets: from micro-single-cell up to super-cell that contains dozens of macro-cells. A hierarchical architecture offers a possible solution to that.

In a practical super cell scenario, 50% of UEs are processed up to the level-0, and 80% of UEs are processed up to the level-1 and so on. The number of the remaining UEs on the top level of the pyramid is far less than that in the flat mode. If this super cell grows up, we can either add the UE processing units to each level or insert another level if total latency allows. Besides, the interface between the two levels can be either the bus or fibers. Two levels are not necessarily at one physical place.

The receiver's performance is not only determined by the algorithm of the detector but also by the precision of the implementation. For example, the performance may be improved by using floating point operation than by conventional fixed point operation. With the aspect of the implementation, the equalizer's performance is affected by the precision of the matrix inverse of the $R_{uu}$ and the multiplication of the matrixes. Now that these functions are moved to the "pre-equalization processing unit," we can focus on how to develop a high precision and high seed pre-equalization processing unit rather than a specific equalizer.

Moreover, because the processing structure on the level is similar to that on the upper level, most software may be reused with minor modification. Whether the metrics are in level-0 or level-1 or other level, the metrics are used to build the equalization and interference cancellation in the exact same way. Therefore, the same software can be implemented on the different levels of the processing unit center.

Although the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

I claim:

1. A method for interference cancellation in a Long Term Evolution (LTE) communication system, the method comprising:
    obtaining, by an LTE network device having a processor, signals, channel coefficients, and a covariance matrix of interference-plus-noise from a plurality of terminals;
    generating, by the LTE network device, a plurality of metrics based on the received raw signals, channel coefficients, and a covariance matrix of interference-plus-noise;
    transmitting, by the LTE network device, the calculated metrics to a signal processing center; and
    calculating intra-cell interferences and inter-cell interferences, by a joint detector with cooperative processing (CoMP) and parallel-interference cancellation (PIC), using the plurality of metrics.

2. The method of claim 1, further comprising:
    removing the intra-cell calculated interferences from the received signals.

3. The method of claim 1, further comprising:
    removing the inter-cell calculated interferences from the received signals.

4. A signal processing apparatus, comprising:
    a plurality of processors coupled with a receiver and configured to obtain a plurality of metrics from a Long Term Evolution (LTE) network device, wherein the plurality of metrics is generated based on raw signals, channel coefficients, and a covariance matrix of interference-plus-noise from a plurality of user elements, and wherein each processor comprises a decoder configured to decode based on the plurality of metrics.

5. The signal processing apparatus of claim 4, wherein the plurality of processors are configured to calculate intra-cell interferences based on the plurality of metrics.

6. The signal processing apparatus of claim 5, wherein the plurality of processors are configured to calculate inter-cell interferences based on the plurality of metrics.

7. The signal processing apparatus of claim 6, wherein the plurality of processors are configured to calculate intra-cell interferences and inter-cell interferences with cooperative processing (CoMP) and parallel-interference cancellation (PIC).

8. A signal processing system, comprising:
    a first signal processing center configured to obtain a plurality of metrics from a Long Term Evolution (LTE) network device, the first signal processing center comprising a plurality of processors configured to calculate interference based on the plurality of metrics; and
    a second signal processing center configured to receive the calculated interference from the first signal processing center.

9. The signal processing system of claim 8, wherein the first signal processing center comprises a first plurality of digital signal processor (DSP) cores.

10. The signal processing system of claim 9, wherein the second signal processing center comprises a second plurality of DSP cores.

11. The signal processing system of claim 10, wherein the first plurality of DSP cores work asynchronously.

12. The signal processing system of claim 10, wherein the second plurality of DSP cores work asynchronously.

* * * * *

UNITED STATES PATENT AND TRADEMARK OFFICE
CERTIFICATE OF CORRECTION

PATENT NO. : 9,231,667 B2  Page 1 of 1
APPLICATION NO. : 13/774495
DATED : January 5, 2016
INVENTOR(S) : Yiqun Ge It is certified that error appears in the above-identified patent and that said Letters Patent is hereby corrected as shown below:

On the Title Page, item (54) and in the Specification, Column 1, Line 2, Title: replace with
--Long-Term Evolution Network Device--.

Signed and Sealed this
Twenty-sixth Day of April, 2016

Michelle K. Lee
*Director of the United States Patent and Trademark Office*